(12) United States Patent
Pezeshki et al.

(10) Patent No.: US 11,937,226 B2
(45) Date of Patent: Mar. 19, 2024

(54) SPACE DIVISION MULTIPLEXING OF REFERENCE SIGNALS

(71) Applicant: QUALCOMM Incorporated, San Diego, CA (US)

(72) Inventors: Hamed Pezeshki, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 17/485,097

(22) Filed: Sep. 24, 2021

(65) Prior Publication Data

US 2023/0096117 A1 Mar. 30, 2023

(51) Int. Cl.
H04W 72/04 (2023.01)
H04B 7/06 (2006.01)
H04L 5/00 (2006.01)
H04W 72/044 (2023.01)

(52) U.S. Cl.
CPC ........ *H04W 72/046* (2013.01); *H04B 7/0626* (2013.01); *H04L 5/0048* (2013.01)

(58) Field of Classification Search
CPC ... H04W 72/046; H04B 7/0626; H04L 5/0048
See application file for complete search history.

(56) References Cited

U.S. PATENT DOCUMENTS

2018/0262313 A1* 9/2018 Nam ..................... H04L 5/0044
2019/0124587 A1* 4/2019 Bergman ............. H04B 7/0617
2019/0182007 A1* 6/2019 Liu ....................... H04L 5/0048
2019/0215048 A1* 7/2019 Cirik ..................... H04B 7/0626

(Continued)

FOREIGN PATENT DOCUMENTS

EP 3471318 A1 4/2019
WO WO-2018031873 A1 2/2018
WO WO-2019102064 A1 5/2019

OTHER PUBLICATIONS

International Search Report and Written Opinion—PCT/US2022/075572—ISA/EPO—dated Dec. 14, 2022.

(Continued)

*Primary Examiner* — Fahmida S Chowdhury
(74) *Attorney, Agent, or Firm* — Holland & Hart LLP/Qualcomm Incorporated

(57) ABSTRACT

Methods, systems, and devices for wireless communication are described to support raw channel estimation. A base station may determine a transmission pattern for a set of multiple transmit beams, where each transmit beam may be associated with a respective reference signal, and may signal the transmission pattern to a user equipment (UE). The transmission pattern may indicate one or more sets of transmit beams, where each set may include two or more transmit beams used for concurrent transmission of respective reference signals. The set of multiple transmit beams may be associated with at least two synchronization signal blocks (SSBs), and the concurrently transmitted reference signals may each be associated with a respective orthogonal cover code. The UE may monitor for concurrently transmitted reference signals based on the transmission pattern, perform associated beamformed measurements, and transmit a channel state information report to the base station.

26 Claims, 15 Drawing Sheets

(56) References Cited

U.S. PATENT DOCUMENTS

| | | | |
|---|---|---|---|
| 2020/0028609 A1* | 1/2020 | Ahn | H04L 1/00 |
| 2020/0045745 A1* | 2/2020 | Cirik | H04W 76/11 |
| 2021/0067978 A1 | 3/2021 | Cheraghi et al. | |
| 2021/0105055 A1* | 4/2021 | Chae | H04L 5/0026 |
| 2021/0314953 A1* | 10/2021 | Park | H04W 76/11 |
| 2021/0360631 A1* | 11/2021 | Cirik | H04L 1/0073 |
| 2021/0378004 A1* | 12/2021 | Cirik | H04W 16/14 |
| 2022/0022141 A1* | 1/2022 | Cirik | H04W 52/325 |
| 2022/0046714 A1* | 2/2022 | Zhou | H04W 72/23 |

OTHER PUBLICATIONS

Qualcomm Inc: "Beamformed CSI-RS Design for CSI Reporting Class B", 3GPP TSG-RAN WG1 #83, R1-157053, 3rd Generation Partnership Project, Mobile Competence Centre, 650, Route Des Lucioles, F-06921 Sophia-Antipolis Cedex, vol. RAN WG1, No. Anaheim, USA, Nov. 15, 2015-Nov. 22, 2015, Nov. 15, 2015, 3 Pages, XP051003354, The whole document.

\* cited by examiner

SPACE DIVISION MULTIPLEXING OF REFERENCE SIGNALS

FIELD OF TECHNOLOGY

The following relates to wireless communication, including space division multiplexing of reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE and a base station may perform channel estimation (e.g., based on one or more reference signal measurements) in order to select one or more beams for wireless communications. In some cases, the channel estimation may lack some information about an associated channel, which may reduce communication performance on the channel.

SUMMARY

The described techniques relate to improved methods, systems, devices, and apparatuses that support space division multiplexing of reference signals. For example, the described techniques provide for estimating a raw (e.g. non-beamformed) communications channel using a smaller number of beamformed measurements. A base station may space division multiplex reference signals (e.g., channel state information reference signals (CSI-RS)) used for beamformed measurements. Such multiplexing may reduce a total number of beamformed measurements for performing channel estimation (e.g., raw channel estimation) by multiplexing concurrently transmitted reference signals in space. The base station may determine a space division multiplexing (SDM) pattern for the reference signals (e.g., CSI-RS) and may signal this multiplexing pattern to a user equipment (UE). For example, the base station may determine a transmission pattern for a set of multiple transmit beams, where each transmit beam may be associated with a respective reference signal (e.g., may be used to transmit a respective reference signal).

The transmission pattern may indicate, for example, one or more sets of transmit beams (e.g., one or more subsets of the set of multiple transmit beams), where each set may include two or more transmit beams used for concurrent transmission of the respective reference signals (e.g., used for space division multiplexing the respective reference signals). In order to perform the raw channel estimation using the beamformed reference signals, the set of multiple transmit beams may be associated with at least two synchronization signal blocks (SSBs) (e.g., at least two SSB beams). The concurrently transmitted reference signals may also each be associated with a respective orthogonal cover code. The UE may monitor for concurrently transmitted reference signals based on the transmission pattern, perform the associated beamformed measurements, and transmit a channel state information (CSI) report (e.g., CSI for the raw channel, corresponding to a raw channel estimation) to the base station.

A method for wireless communication at a UE is described. The method may include receiving, from a base station, signaling that indicates a transmission pattern for a set of multiple transmit beams associated with two or more SSBs, where the transmission pattern corresponds to sets of two or more concurrently transmitted beams within the set of multiple transmit beams, monitoring for a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code, and transmitting CSI to the base station based on monitoring for the set of multiple reference signals.

An apparatus for wireless communication at a UE is described. The apparatus may include a processor, memory coupled with the processor, and instructions stored in the memory. The instructions may be executable by the processor to cause the apparatus to receive, from a base station, signaling that indicates a transmission pattern for a set of multiple transmit beams associated with two or more SSBs, where the transmission pattern corresponds to sets of two or more concurrently transmitted beams within the set of multiple transmit beams, monitor for a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code, and transmit CSI to the base station based on monitoring for the set of multiple reference signals.

Another apparatus for wireless communication at a UE is described. The apparatus may include means for receiving, from a base station, signaling that indicates a transmission pattern for a set of multiple transmit beams associated with two or more SSBs, where the transmission pattern corresponds to sets of two or more concurrently transmitted beams within the set of multiple transmit beams, means for monitoring for a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code, and means for transmitting CSI to the base station based on monitoring for the set of multiple reference signals.

A non-transitory computer-readable medium storing code for wireless communication at a UE is described. The code may include instructions executable by a processor to receive, from a base station, signaling that indicates a transmission pattern for a set of multiple transmit beams associated with two or more SSBs, where the transmission pattern corresponds to sets of two or more concurrently transmitted beams within the set of multiple transmit beams, monitor for a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code, and transmit CSI to the base station based on monitoring for the set of multiple reference signals.

In some examples of the method, apparatuses, and non-transitory computer-readable medium described herein, monitoring for the set of multiple reference signals may include operations, features, means, or instructions for monitoring, during a first symbol period, for a first set of two or more reference signals within the set of multiple reference signals and associated with a first set of two or more concurrently transmitted beams within the set of multiple transmit beams and monitoring, during a second symbol period, for a second set of two or more reference signals within the set of multiple reference signals and associated with a second set of two or more concurrently transmitted beams within the set of multiple transmit beams.

In some examples of the method, apparatuses, and non-transitory computer-readable medium described herein, receiving the signaling that indicates the transmission pattern may include operations, features, means, or instructions for receiving, for each of the set of multiple reference signals, an indication of the respective orthogonal cover code for the reference signal.

In some examples of the method, apparatuses, and non-transitory computer-readable medium described herein, a set of two or more reference signals within the set of multiple reference signals and associated with a set of two or more concurrently transmitted beams within the set of multiple transmit beams includes a first reference signal associated with a first SSB of the two or more SSBs and a second reference signal associated with a second SSB of the two or more SSBs.

In some examples of the method, apparatuses, and non-transitory computer-readable medium described herein, a set of two or more reference signals within the set of multiple reference signals and associated with a set of two or more concurrently transmitted beams within the set of multiple transmit beams includes at least two reference signals associated with a same SSB within the two or more SSBs.

In some examples of the method, apparatuses, and non-transitory computer-readable medium described herein, receiving the signaling that indicates the transmission pattern may include operations, features, means, or instructions for receiving, for each of the set of multiple transmit beams, an indication of a corresponding reference signal of the set of multiple reference signals.

In some examples of the method, apparatuses, and non-transitory computer-readable medium described herein, dimensions of a channel associated with the CSI may be based on a total number of receive antenna ports of the UE and a total number of transmit antenna ports of the base station.

In some examples of the method, apparatuses, and non-transitory computer-readable medium described herein, receiving the signaling that indicates the transmission pattern may include operations, features, means, or instructions for receiving downlink control information (DCI), a medium access control-control element (MAC-CE), radio resource control (RRC) signaling, or any combination thereof that indicates the transmission pattern.

A method for wireless communication at a base station is described. The method may include transmitting, to a UE, signaling that indicates a transmission pattern for a set of multiple transmit beams associated with two or more SSBs, where the transmission pattern corresponds to sets of two or more concurrently transmitted beams within the set of multiple transmit beams, transmitting a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code, and receiving CSI from the UE based on transmitting the set of multiple reference signals.

An apparatus for wireless communication at a base station is described. The apparatus may include a processor, memory coupled with the processor, and instructions stored in the memory. The instructions may be executable by the processor to cause the apparatus to transmit, to a UE, signaling that indicates a transmission pattern for a set of multiple transmit beams associated with two or more SSBs, where the transmission pattern corresponds to sets of two or more concurrently transmitted beams within the set of multiple transmit beams, transmit a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code, and receive CSI from the UE based on transmitting the set of multiple reference signals.

Another apparatus for wireless communication at a base station is described. The apparatus may include means for transmitting, to a UE, signaling that indicates a transmission pattern for a set of multiple transmit beams associated with two or more SSBs, where the transmission pattern corresponds to sets of two or more concurrently transmitted beams within the set of multiple transmit beams, means for transmitting a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code, and means for receiving CSI from the UE based on transmitting the set of multiple reference signals.

A non-transitory computer-readable medium storing code for wireless communication at a base station is described. The code may include instructions executable by a processor to transmit, to a UE, signaling that indicates a transmission pattern for a set of multiple transmit beams associated with two or more SSBs, where the transmission pattern corresponds to sets of two or more concurrently transmitted beams within the set of multiple transmit beams, transmit a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code, and receive CSI from the UE based on transmitting the set of multiple reference signals.

In some examples of the method, apparatuses, and non-transitory computer-readable medium described herein, transmitting the set of multiple reference signals may include operations, features, means, or instructions for transmitting, during a first symbol period, a first set of two or more reference signals within the set of multiple reference signals and associated with a first set of two or more concurrently transmitted beams within the set of multiple transmit beams and transmitting, during a second symbol period, a second set of two or more reference signals within the set of multiple reference signals and associated with a second set of two or more concurrently transmitted beams within the set of multiple transmit beams.

In some examples of the method, apparatuses, and non-transitory computer-readable medium described herein, transmitting the signaling that indicates the transmission pattern may include operations, features, means, or instructions for transmitting, for each of the set of multiple reference signals, an indication of the respective orthogonal cover code for the reference signal.

In some examples of the method, apparatuses, and non-transitory computer-readable medium described herein, a set of two or more reference signals within the set of multiple reference signals and associated with a set of two or more concurrently transmitted beams within the set of multiple transmit beams includes a first reference signal associated with a first SSB of the two or more SSBs and a second reference signal associated with a second SSB of the two or more SSBs.

In some examples of the method, apparatuses, and non-transitory computer-readable medium described herein, a set of two or more reference signals within the set of multiple reference signals and associated with a set of two or more concurrently transmitted beams within the set of multiple transmit beams includes at least two reference signals associated with a same SSB within the two or more SSBs.

In some examples of the method, apparatuses, and non-transitory computer-readable medium described herein, transmitting the signaling that indicates the transmission pattern may include operations, features, means, or instructions for transmitting, for each of the set of multiple transmit beams, an indication of a corresponding reference signal of the set of multiple reference signals.

In some examples of the method, apparatuses, and non-transitory computer-readable medium described herein, a dimension of a channel associated with the CSI may be based on a total number of receive antenna ports of the UE and a total number of transmit antenna ports of the base station.

In some examples of the method, apparatuses, and non-transitory computer-readable medium described herein, transmitting the signaling that indicates the transmission pattern may include operations, features, means, or instructions for transmitting DCI, a MAC CE, RRC signaling, or any combination thereof that indicates the transmission pattern.

DETAILED DESCRIPTION

Figure 1:
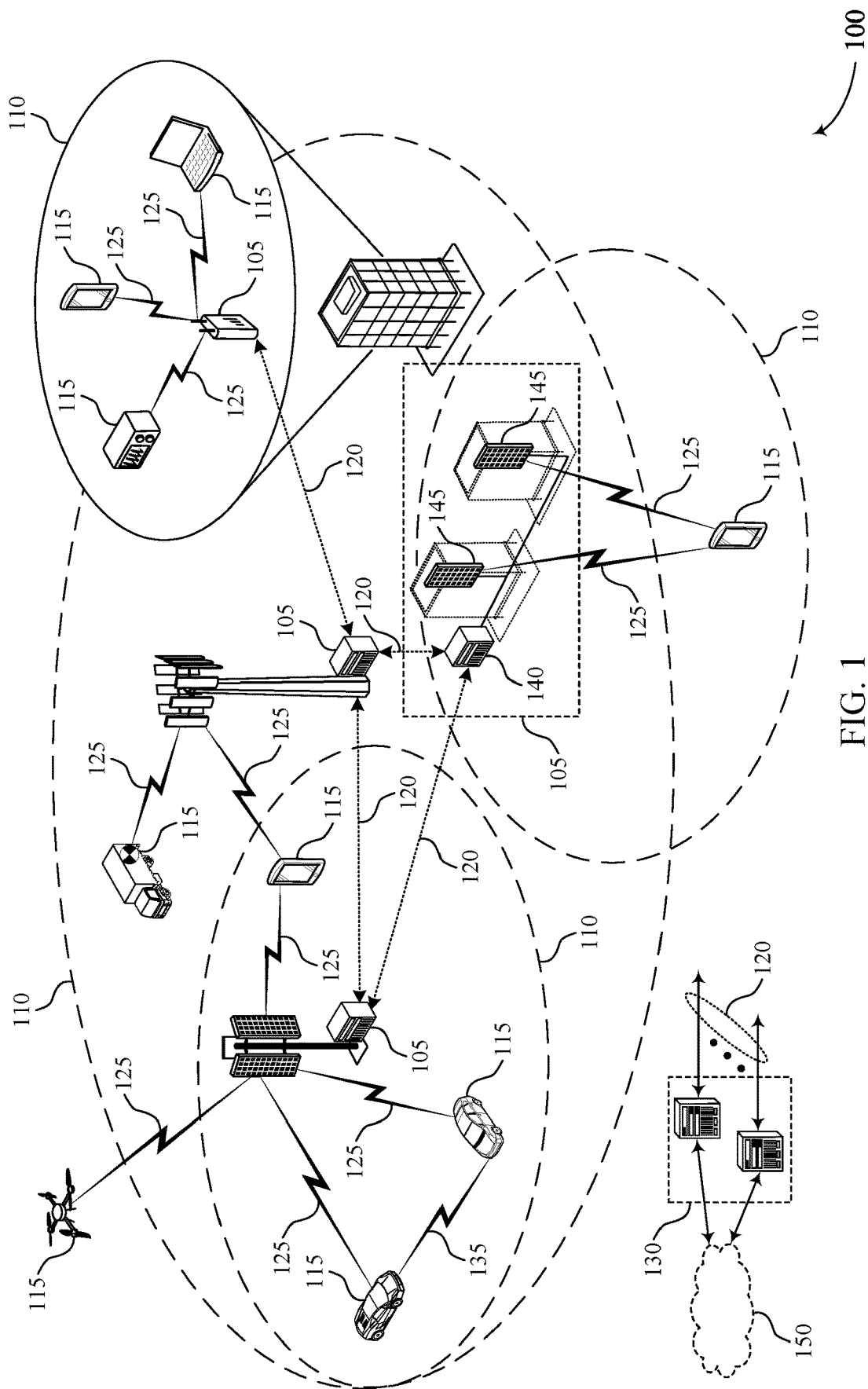
FIG. 1 illustrates an example of a wireless communications system that supports space division multiplexing of reference signals in accordance with aspects of the present disclosure.

A base station may transmit signals to a UE using one or more transmit beams, and the UE may receive (e.g., attempt to receive, monitor for) signals from the base station using one or more receive beams, where the base station and the UE may transmit beamformed signals (e.g., may shape beams for reception or transmission) using a respective antenna array. Some analog and hybrid beamforming schemes may be limited to receive signals in one direction at a time, or in a limited number of directions at a time (e.g., two or three directions), which may, in turn, limit a multiplexing capability of a wireless device (e.g., a UE or base station).

As described herein, a wireless device may implement digital beamforming (e.g., or aspects thereof), where the wireless device may perform a raw channel estimation (e.g., using beamformed channel measurements) to support the digital beamforming. The raw channel may refer to the communications channel between the base station and the UE in the absence of beamforming (e.g., as observed at the antenna ports of the base station or UE in the absence of analog beamforming) and may alternatively be referred to as the full channel, non-beamformed channel, or complete channel. Hence, the raw channel (and related channel state information) may be applicable to any signaling between the base station and the UE, including beamformed signaling using any beam pair link (e.g., whether the beam pair link includes a predefined transmit beam and predefined receive beams based on the codebook, or whether the beam pair link includes one or more customized—e.g., non-codebook-based—beams).

In some cases, a raw channel may be represented by a channel matrix, and hence estimating the raw channel may include determining the channel matrix. At least one dimension of the channel matrix for the raw channel between a receiving device and a transmitting device may be based on a total quantity of receive antenna ports of the receiving device, or a total quantity of transmit antenna ports of the transmitting device (e.g., base station 105-a), or both. For example, a first dimension of the channel matrix may be equal to the total quantity of receive antenna ports of the receiving device, and a second dimension of the channel matrix may be equal to the total quantity of transmit antenna ports of the transmitting device—e.g., if the receiving device has 8 receive antenna ports and the transmitting device has 64 transmit antenna ports, the channel matrix may be an 8×64 matrix and thus include 512 elements. Compared with other techniques, raw channel estimation may support improved selection of transmit beams and receive beams (e.g., for analog or digital beamforming), an improved ability to utilize custom (e.g., non-codebook-based) beam directions that are better optimized for the channel, among other possible advantages.

When performing a raw channel estimation, the channel estimation may in some cases be based on a total number of possible beamformed channel measurements, which may be based on a total number of beams available at the base station and the UE (e.g., which may in turn be based on a total number of available antenna elements at the UE and the base station). However, measuring each possible transmit beam and receive beam combination may result in a relatively large increase in overhead (e.g., due to a quantity of measurements performed). In such cases, the overhead used for channel estimation may consume a relatively large amount of resources (e.g., time and frequency resources), and by the time the measurements were completed, some earlier measurements may no longer be valid or accurate for the channel, the conditions of which may fluctuate in time.

The present disclosure provides techniques for performing a raw channel estimation (e.g., estimating an underlying raw channel, or a channel associated with all of the antenna elements of the UE and the base station) using a smaller number of beamformed measurements. In order to perform such a raw channel estimation, the smaller number of beamformed measurements may be selected using one or more sparse recovery algorithms. Additionally or alternatively, the raw channel may be reconstructed from beamformed measurements (e.g., a smaller number of beamformed measurements) using machine learning.

In order to reduce an amount of overhead associated with the beamformed measurements for the raw channel estimation, the base station may space division multiplex reference signals (e.g., channel state information reference signals (CSI-RS)) used for the beamformed measurements. Such multiplexing may reduce a total number of beamformed measurements for performing the raw channel estimation by multiplexing the reference signals in space, which may reduce a time resource usage, a frequency resource usage, or both, for the raw channel estimation. The base station may, for example, determine an SDM pattern for the reference signals (e.g., CSI-RS) and may signal this multiplexing pattern to the UE.

For example, the base station may determine a transmission pattern for a set of multiple transmit beams, where each transmit beam may be associated with a respective reference signal (e.g., may be used to transmit a respective reference signal). The transmission pattern may indicate, for example, one or more sets of transmit beams (e.g., one or more subsets of the set of multiple transmit beams), where each set may include two or more transmit beams used for concurrent transmission of the respective reference signals (e.g., used for space division multiplexing the respective reference signals). In order to perform the raw channel estimation using the beamformed reference signals, the set of multiple transmit beams may be associated with at least two synchronization signal blocks (SSBs) (e.g., at least two SSB beams). In some cases, each reference signal (e.g., and associated transmit beam) may also be associated with a respective receive beam at UE. The transmission pattern may also indicate a pattern in time for the one or more sets of transmit beams. For example, the transmission pattern may indicate a first set of two or more transmit beams is to be used at a first time, a second set of two or more transmit beams is to be used at a second time, and so forth.

The concurrently transmitted reference signals may each be associated with a respective orthogonal cover code, which may orthogonalize the concurrent reference signal transmissions and support decoding of the reference signals at the UE. By space division multiplexing two or more reference signals (e.g., CSI-RS) in each time period (e.g., in each symbol), the measurement overhead for performing the raw channel estimation may be reduced. For example, the UE may monitor for concurrently transmitted reference signals, perform the associated beamformed measurements, and transmit a channel state information (CSI) report (e.g., a raw channel estimation) to the base station, where the CSI report may support raw channel estimation for digital beamforming, or for individualized analog beamforming.

Aspects of the disclosure are initially described in the context of wireless communications systems. Aspects of the disclosure are further illustrated by and described with reference to a process flow, apparatus diagrams, system diagrams, and flowcharts that relate to space division multiplexing of reference signals.

FIG. 1 illustrates an example of a wireless communications system 100 that supports space division multiplexing of reference signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In order to reduce an amount of overhead associated with beamformed measurements for a raw channel estimation, a base station 105 may space division multiplex reference signals used for the beamformed measurements. For example, the base station 105 may determine a transmission pattern for a set of multiple transmit beams, where each transmit beam may be associated with a respective reference signal (e.g., may be used to transmit a respective reference signal), and may signal an indication of the transmission pattern to a UE 115. The transmission pattern may indicate, for example, one or more sets of transmit beams (e.g., one or more subsets of the set of multiple transmit beams), where each set may include two or more transmit beams used for concurrent transmission of the respective reference signals (e.g., used for space division multiplexing the respective reference signals).

The concurrently transmitted reference signals may each be associated with a respective orthogonal cover code, which may orthogonalize the concurrent reference signal transmissions and support decoding of the reference signals at the UE 115. The UE 115 may monitor for concurrently transmitted reference signals, perform the associated beamformed measurements, and transmit a CSI report to the base station 105, where the CSI report may support raw channel estimation.

Figure 2A:
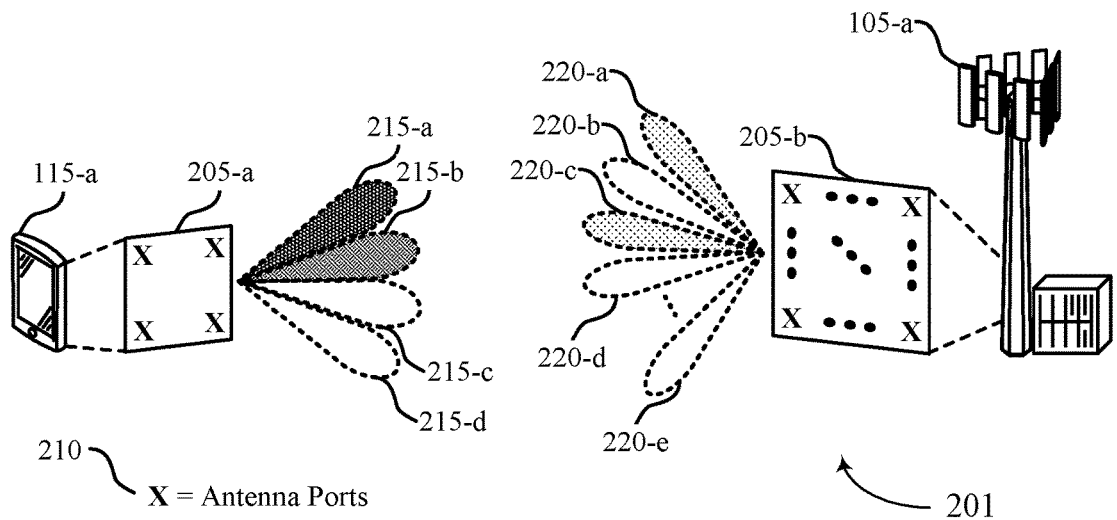
FIGS. 2A, 2B and 2C illustrate examples of a wireless communications system that supports space division multiplexing of reference signals in accordance with aspects of the present disclosure.
Figure 2B:
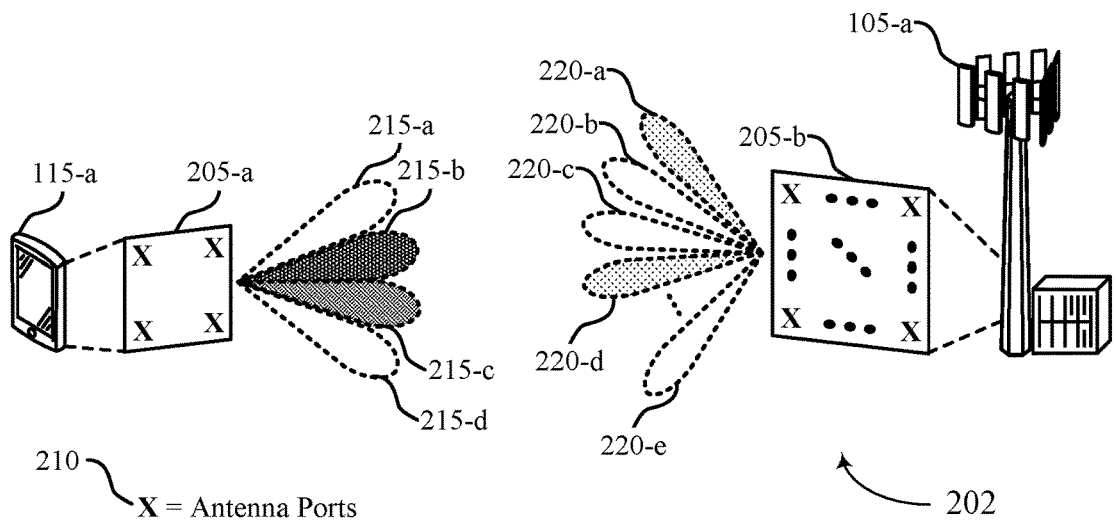
Figure 2C:
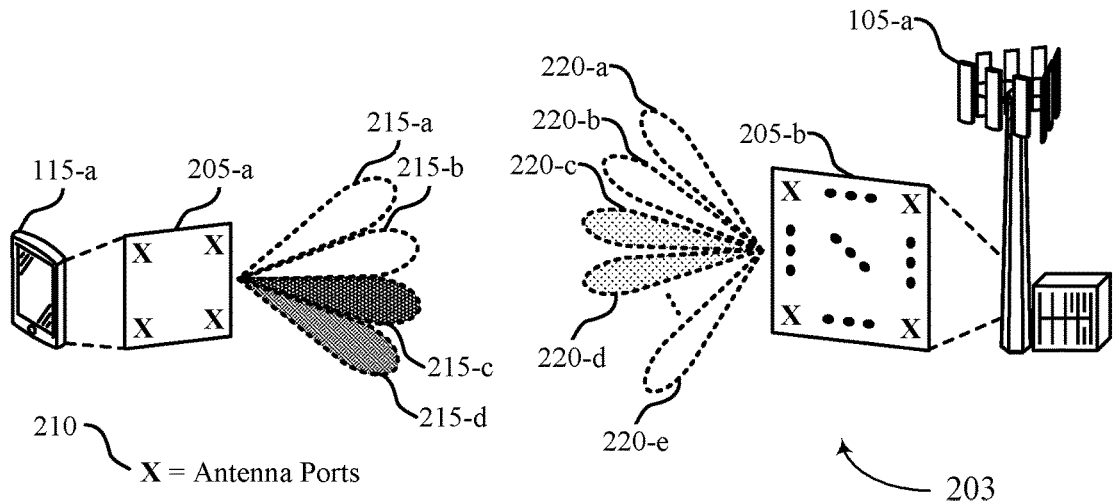

FIGS. 2A, 2B, and 2C illustrate examples of wireless communications systems 201, 202, and 203 that support space division multiplexing of reference signals in accordance with aspects of the present disclosure. In some examples, some aspects of wireless communications systems 201, 202, and 203 may implement or be implemented by aspects of wireless communications system 100. For example, wireless communications systems 201, 202, and 203 may include a base station 105-a and UE 115-a, which may be examples of a base station 105 and a UE 115 described with reference to FIG. 1. FIG. 2A may illustrate base station 105-a and UE 115-a at a first time (e.g., during a first time period), FIG. 2B may illustrate base station 105-a and UE 115-a at a second time (e.g., during a second time period), and FIG. 2C may illustrate base station 105-a and UE 115-a at a third time (e.g., during a third time period).

Base station 105-a may transmit signals to UE 115-a using one or more transmit beams 220. For example, base station 105-a may use one or more beams of a set of transmit beams that ranges from a transmit beam 220-a to a transmit beam 220-e (e.g., among other examples), where each transmit beam 220 may be associated with a respective direction (e.g., one or more respective directional qualities, such as an angle relative to an antenna panel 205-b). Similarly, UE 115-a may receive (e.g., attempt to receive, monitor for) signals from base station 105-a using one or more receive beams 215. For example, UE 115-a may use one or more beams of a set of receive beams ranging from a receive beam 215-a to a receive beam 215-d, where each receive beam 215 may be associated with a respective direction (e.g., one or more respective directional qualities, such as an angle relative to an antenna panel 205-a). While some quantities of beams (e.g., transmit beams 220 and/or receive beams 215) are described herein, it is to be understood that the examples described herein may apply to any number of transmit beams 220 or receive beams 215 without departing from the scope of the present disclosure.

Base station 105-a and UE 115-a may transmit beamformed signals (e.g., may shape beams for reception or transmission) using a respective antenna panel 205. For example, UE 115-a may include or be coupled with an antenna panel 205-a, which may be associated with a respective set of antenna ports 210. Each illustrated antenna port 210 may, for example, represent one or more antenna ports 210. For example, in some cases, each antenna port 210 illustrated in FIG. 2 may represent a first corresponding antenna port 210 associated with a first polarity, such as a horizontal polarity, and a second corresponding antenna port 210 associated with a second polarity, such as a vertical polarity. Thus, for example, antenna panel 205-a may include eight antenna ports 210 (e.g., four antenna ports 210 associated with the first polarity and four antenna ports 210 associated with the second polarity), and antenna panel 205-b may include 64 antenna ports 210 (e.g., 32 antenna ports 210 associated with the first polarity and 32 antenna ports 210 associated with the second polarity). It is to be understood that these and any other specific numeric quantities described herein are merely examples provided for illustrative purposes and are not limiting of the claims.

UE 115-a and base station 105-a may also each include one or more respective transceivers, which may be used to process signals for transmission or reception at the corresponding device (e.g., in conjunction with or including the antenna panels 205). Each transceiver may include one or more components associated with transmission and reception of wireless signals (e.g., one or more radio frequency (RF) chains, beamforming components. antenna modules). UE 115-a and base station 105-a may use the respective transceiver (e.g., a mmW transceiver) to perform analog or hybrid beamforming. The beamforming may be performed using a RF, or at an intermediate frequency (IF), using a bank of phase shifters (e.g., one phase shifter per antenna element of an antenna panel 205).

In one example architecture used for analog or hybrid beamforming (e.g., at UE 115-a or base station 105-a), power consumption may be reduced by using one analog to digital converter (ADC) (e.g., a high resolution ADC) per RF chain at a receiver (e.g., a receiver portion of the transceiver). Similarly, the example architecture may use one digital to analog converter (DAC) (e.g., a high-resolution DAC) per RF chain at a transmitter (e.g., at a transmitting portion of the transceiver). While such an architecture for analog or hybrid beamforming may be power efficient (e.g., may use relatively less power per signal or per component than other architectures), analog and hybrid beamforming schemes may be limited to receive signals in one direction at a time, or in a limited number of directions at a time (e.g., two or three directions). Such limitations may, in turn, limit a multiplexing capability of a wireless device (e.g., UE 115-a or base station 105-a) that uses analog or hybrid beamforming.

As such, some wireless devices may implement digital beamforming (e.g., or aspects thereof) at mmW or other frequencies. When performing digital beamforming, some beamforming architectures may include one or more low-resolution ADCs and/or DACs, which may limit or reduce power consumption of the associated transceiver(s). However, estimating a channel (e.g., for beamforming) using a low-resolution ADC and/or DAC may result in higher computation complexity, or may generally increase a difficulty of channel estimation. As such, when operating using one or more low-resolution ADCs and/or DACs, a wireless device may perform a raw channel estimation (e.g., using beamforming channel measurements), which may support channel estimation for digital beamforming with low-resolution ADC(s) and/or DAC(s). Raw channel estimation may also support individual selection (e.g., individual optimization) of transmit beams 220 and receive beams 215 (e.g., may enhance analog or digital beamforming), compared with other techniques which may be limited to using a default codebook of beams (e.g., a discrete Fourier transform (DFT)-based codebook).

When performing a raw channel estimation, the channel estimation may be based on a total number of possible beamformed channel measurements, which may be based on a total number of beams available at base station 105-a and UE 115-a (e.g., which may in turn be based on a total number of available antenna ports 210 at UE 115-a and base station 105-a). The raw channel estimation may include estimating a channel matrix corresponding to the raw channel, where a representation (e.g., a compressed representation) of the channel matrix or some other CSI metric (e.g., PMI, rank indicator (RI), or channel quality information (CQI)) calculated based on the channel matrix may be sent by the UE 115-a to provide CSI corresponding to the raw the channel. In some cases, the channel matrix have two dimensions (e.g., be a two-dimensional matrix), where a first dimension corresponds to a number of beams available at base station 105-a (e.g., based on a total number of antenna ports at base station 105-a) and a second dimension corresponds to a number of beams available at UE 115-a (e.g., based on a total number of antenna ports 210 at UE 115-a). For example, a first dimension of the channel matrix may be equal to the total quantity of receive antenna ports of the receiving device (or of an antenna panel 205 thereof), and a second dimension of the channel matrix may be equal to the total quantity of transmit antenna ports of the transmitting device (or of an antenna panel 205 thereof)—e.g., if the receiving device has 8 receive antenna ports and the transmitting device has 64 transmit antenna ports, the channel matrix may be an 8×64 matrix and thus include 512 elements.

In accordance with some techniques for raw channel estimation, each beam pair (e.g., each pair of a transmit beam 220 and a receive beam 215) may be associated with a respective channel measurement. As such, the raw channel estimation may be associated with a number of measurements equal to the number of beams available at base station 105-a multiplied by the number of beams available at UE 115-a. For example, 64 beams may be available at base station 105-a and eight beams may be available at UE 115-a (e.g., where a quantity of beams may be the same as a quantity of antenna ports 210 for the respective device). In such cases, a total number of possible beamformed measurements for the raw channel estimation may be equal to the product of 64 and 8 (e.g., 64×8), or 512 measurements. However, measuring each transmit beam 220 and receive beam 215 combination may result in a relatively large increase in overhead (e.g., due to the quantity of measurements performed). In such cases, the overhead used for channel estimation may consume a relatively large amount of resources (e.g., time and frequency resources), and by the time the measurements were completed some of the earlier measurements may no longer be valid or accurate for the channel (e.g., may be stale).

The present disclosure provides techniques for performing a raw channel estimation (e.g., estimating an underlying raw channel, or a channel that is independent of which particular beams are used for communication) using a smaller number of beamformed measurements, for example, based on a sparsity of mmW channels. In order to perform such a raw channel estimation, the smaller number of beamformed measurements may be selected using one or more sparse recovery algorithms, such as an orthogonal matching pursuit, or using one or more other compressed sensing techniques. Additionally or alternatively, the raw channel may be reconstructed from beamformed measurements (e.g., a smaller number of beamformed measurements) using machine learning.

Further, in order to reduce an amount of overhead associated with the beamformed measurements for the raw channel estimation, base station 105-a may space division multiplex reference signals (e.g., CSI-RS) used for beamformed measurements. Such multiplexing may reduce a total number of beamformed measurements for performing the raw channel estimation by multiplexing the reference signals in space, which may reduce a time resource usage, a frequency resource usage, or both, for the raw channel estimation. Base station 105-a may determine an SDM pattern for the reference signals (e.g., CSI-RS) and may signal this multiplexing pattern to UE 115-a.

For example, base station 105-a may determine a transmission pattern for a set of multiple transmit beams 220, where each transmit beam 220 may be associated with a respective reference signal (e.g., as indicated via a reference signal identifier (ID) within the transmission pattern). Base station 105-a may signal the transmission pattern (e.g., multiplexing pattern) to UE 115-a dynamically (e.g., via a downlink control information (DCI)) or semi-statically (e.g., via a MAC control element (CE) (MAC-CE) or RRC signaling). For example, the transmission pattern may be a part of an RRC information element CSIResourceConfig (e.g., signaling in which base station 105-a configures UE 115-a with CSI resources to measure). The transmission pattern may indicate, for example, one or more sets of transmit beams 220 (e.g., one or more subsets of the set of multiple transmit beams), where each set may include two or more transmit beams 220 used for concurrent transmission of the respective reference signals (e.g., space division multiplexing the respective reference signals).

In order to perform the raw channel estimation using the beamformed reference signals, the set of multiple transmit beams 220 may be associated with at least two SSBs (e.g., at least two SSB beams). Further, each set of two or more transmit beams 220 may include transmit beams 220 associated with a same SSB (e.g., a same SSB beam), or may include transmit beams 220 that are associated with different SSBs (e.g., associated with two or more SSBs, two or more SSB beams). Accordingly, the set of multiple transmit beams 220 may be associated with at least two SSBs (e.g., at least two SSB beams), while each set of two or more transmit beams 220 within the set of multiple transmit beams may be associated with a same SSB, or with different SSBs. In some cases, each reference signal (e.g., and associated transmit beam 220) may also be associated with a respective receive beam 215 at UE 115-a.

The transmission pattern may also indicate a pattern in time, for the one or more sets of transmit beams 220. For example, the transmission pattern may indicate a first set of two or more transmit beams 220 is to be used at a first time, a second set of two or more transmit beams 220 is to be used at a second time, and so forth. In some cases, the different time periods may correspond to different symbols, or symbol periods, such that multiple symbols may be utilized to transmit the reference signals for the raw channel estimation.

In one example illustrated by FIGS. 2A, 2B, and 2C, different combinations of reference signals and beam directions may be used in each symbol period (e.g., each time period), according to the indicated transmit beam pattern. For example, as illustrated by FIG. 2A, in a first time period (e.g., first symbol) transmit beams 220-a and 220-c may be used for reference signal transmission at base station 105-a, where transmit beams 220-a and 220-c may be associated with a first and a third reference signal (e.g., CSI-RS1 and CSI-RS3), respectively, as well as being associated with receive beams 215-a and 215-b at UE 115-a.

As illustrated by FIG. 2B, in a second time period (e.g., second symbol) transmit beams 220-a and 220-d may be used for reference signal transmission at base station 105-a, where transmit beams 220-a and 220-d may be associated with a first and a kth reference signal (e.g., CSI-RS1 and CSI-RSk), respectively, as well as being associated with receive beams 215-b and 215-c at UE 115-a. As illustrated by FIG. 2C, in a third time period (e.g., third symbol) transmit beams 220-c and 220-d may be used for reference signal transmission at base station 105-a, where transmit beams 220-c and 220-d may be associated with a third and a kth reference signal (e.g., CSI-RS1 and CSI-RS3), respectively, as well as being associated with receive beams 215-c and 215-d at UE 115-a.

The concurrently transmitted reference signals may each be associated with a respective orthogonal cover code (e.g., a Walsh code), which may orthogonalize the concurrent reference signal transmissions and support decoding of the reference signals at UE 115-a. These orthogonal cover codes may be signaled from base station 105-a to UE 115-a in order to support reception of the reference signals at UE 115-a. For example, the transmission pattern or other signaling may indicate a respective orthogonal cover code for each reference signal.

Based on space division multiplexing two or more reference signals (e.g., CSI-RS) in each time period (e.g., in each symbol), the measurement overhead for performing the raw channel estimation may be reduced by a factor corresponding to the quantity of concurrently transmitted reference signals. For example, if two reference signals are concurrently transmitted within a symbol (e.g., using the corresponding transmit beams 220), an amount of overhead resource use and/or signaling may be reduced by up to half. Similarly, if k reference signals are concurrently transmitted within a symbol (e.g., using the corresponding transmit beams 220), an amount of overhead resource use and/or signaling may be reduced by up to 1/k.

Based on the transmission pattern, base station 105-a may concurrently transmit two or more reference signals, using respective transmit beams 220 (e.g., and may do so across multiple symbols, or time periods). UE 115-a may monitor for the concurrently transmitted reference signals (e.g., according to the transmission pattern) and may perform beamformed measurements of the raw channel (e.g., receive beam measurements) based on the monitoring. For example, UE 115-a may attempt to receive the reference signals of the transmission pattern using corresponding receive beams 215, as described herein. Based on the monitoring, and performing the associated beamformed measurements, UE 115-a may transmit a CSI report (e.g., a raw channel estimation) to base station 105-a, where the CSI report may support raw channel estimation for digital beamforming, or for individualized analog beamforming, as described herein. For example, UE 115-a may transmit the CSI report to base station 105-a via resources configured by base station 105-a. For example, base station 105-a may configure UE 115-a with resources for reporting CSI measurements via an RRC information element (e.g., a CSIReportConfig element, as one example).

Figure 3:
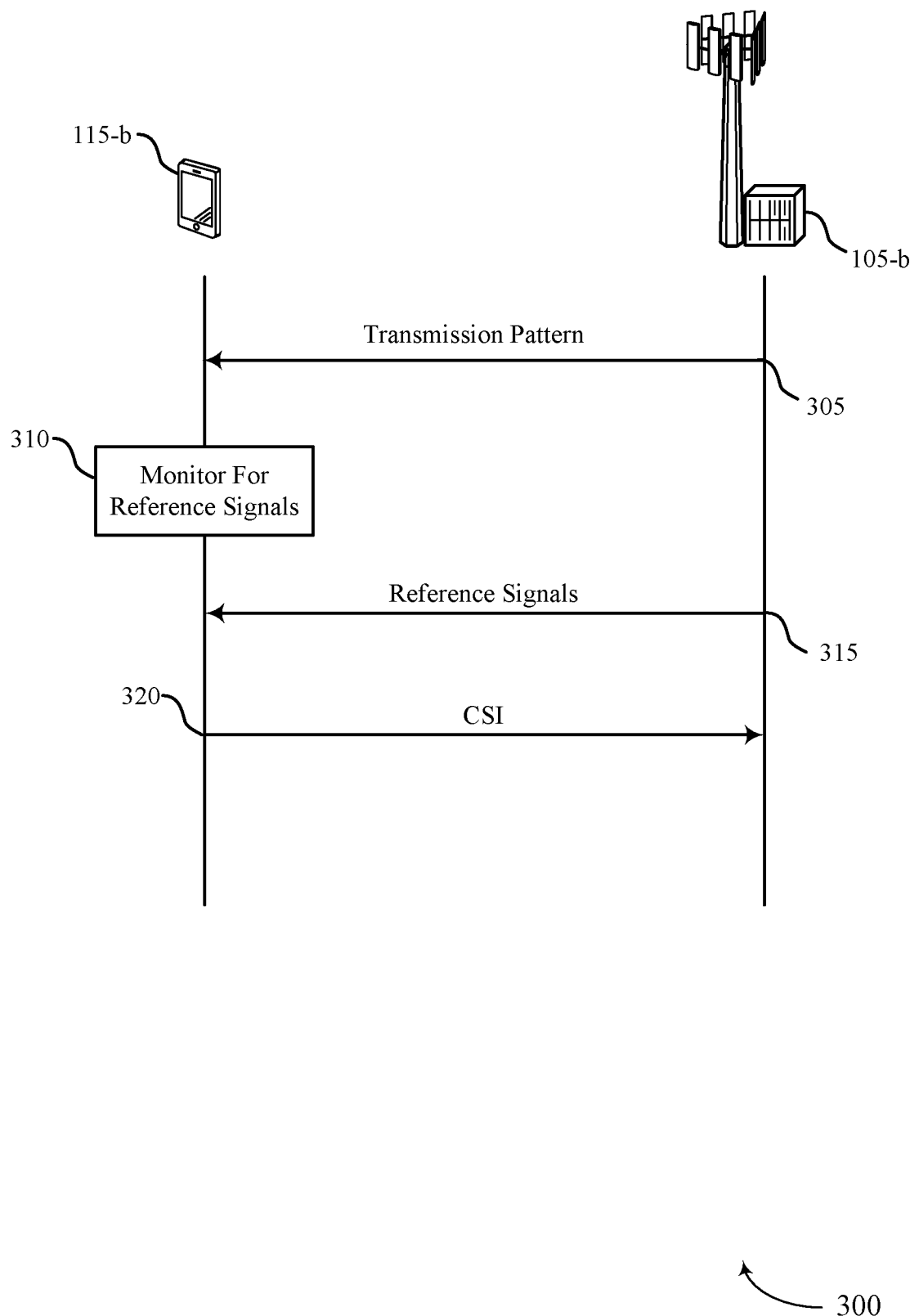
FIG. 3 illustrates an example of a process flow that supports space division multiplexing of reference signals in accordance with aspects of the present disclosure.

FIG. 3 illustrates an example of a process flow 300 that supports space division multiplexing of reference signals in accordance with aspects of the present disclosure. In some examples, some aspects of process flow 300 may implement or be implemented by aspects of wireless communications system 100 or 200. For example, process flow 300 may be implemented by a base station 105-b and a UE 115-b, which may be examples of a base station 105 and a UE 115 described with reference to FIGS. 1 and 2. Base station 105-b and UE 115-b may implement one or more aspects of process flow 300 in order to space division multiplex reference signals for channel estimation, as described herein with reference to FIG. 2.

In the following description of process flow 300, the operations may be performed in a different order than the order shown, or the operations performed by UE 115-b and base station 105-b may be performed in different orders or at different times. For example, some operations may also be left out of process flow 300, or other operations may be added to process flow 300. As another example, operations shown as performed in a single instance (e.g., a single transmission) may in some cases be performed as multiple instances (e.g., multiple transmissions) over some duration of time, or multiple transmissions may be combined into a single transmission instance. Although UE 115-b and base station 105-b are shown performing the operations of process flow 300, some aspects of some operations may also be performed by one or more other wireless devices.

At 305, base station 105-b may transmit, to UE 115-b, signaling that indicates a transmission pattern for a set of multiple transmit beams associated with two or more SSBs (e.g., as a part of an RRC information element, such as a CSIResourceConfig element as one example). As described herein with reference to FIG. 2, the transmission pattern may correspond to (e.g., may include or indicate) sets of two or more concurrently transmitted beams within the set of multiple of transmit beams.

The set of multiple transmit beams may also be associated with a set of multiple reference signals (e.g., via the transmission pattern), where each of the sets of two or more concurrently transmitted beams may be associated with a respective set of two or more reference signals within the set of multiple of reference signals. Each reference signal of a set of two or more reference signals may also be associated with a respective orthogonal cover code (e.g., indicated via the signaling indicating the transmission pattern or via other signaling), where the orthogonal cover codes may support orthogonalization of the two or more reference signals.

At 310, UE 115-*b* may monitor for the set of multiple reference signals based on the transmission pattern. For example, UE 115-*b* may attempt to receive the set of multiple reference signals, using a respective receive beam for each reference signal (e.g., may perform beamformed measurements for the set of multiple reference signals).

At 315, base station 105-*b* may transmit and UE 115-*b* may receive the set of multiple reference signals based on the transmission pattern. For example, base station 105-*b* may transmit each of the set of multiple reference signals within a respective set of two or more reference signals and using a corresponding transmit beam. Base station 105-*b* may also transmit each of a set of two or more reference signals using a respective orthogonal cover code.

At 320, UE 115-*b* may transmit, to base station 105-*b*, CSI (e.g., a CSI report) based on monitoring for the set of multiple reference signals. The CSI may, for example, be associated with, or indicate, measurements or other CSI metrics for a raw channel as described herein. For example, the CSI may be associated with a channel matrix that has dimensions that are based on a total number of receive antenna ports (e.g., antenna elements) of UE 115-*b*, a total number of transmit antenna ports (e.g., antenna elements) of base station 105-*b*, or both. where the UE 115-*b* may estimate such a channel metric based on the reference signals received at 315.

Figure 4:
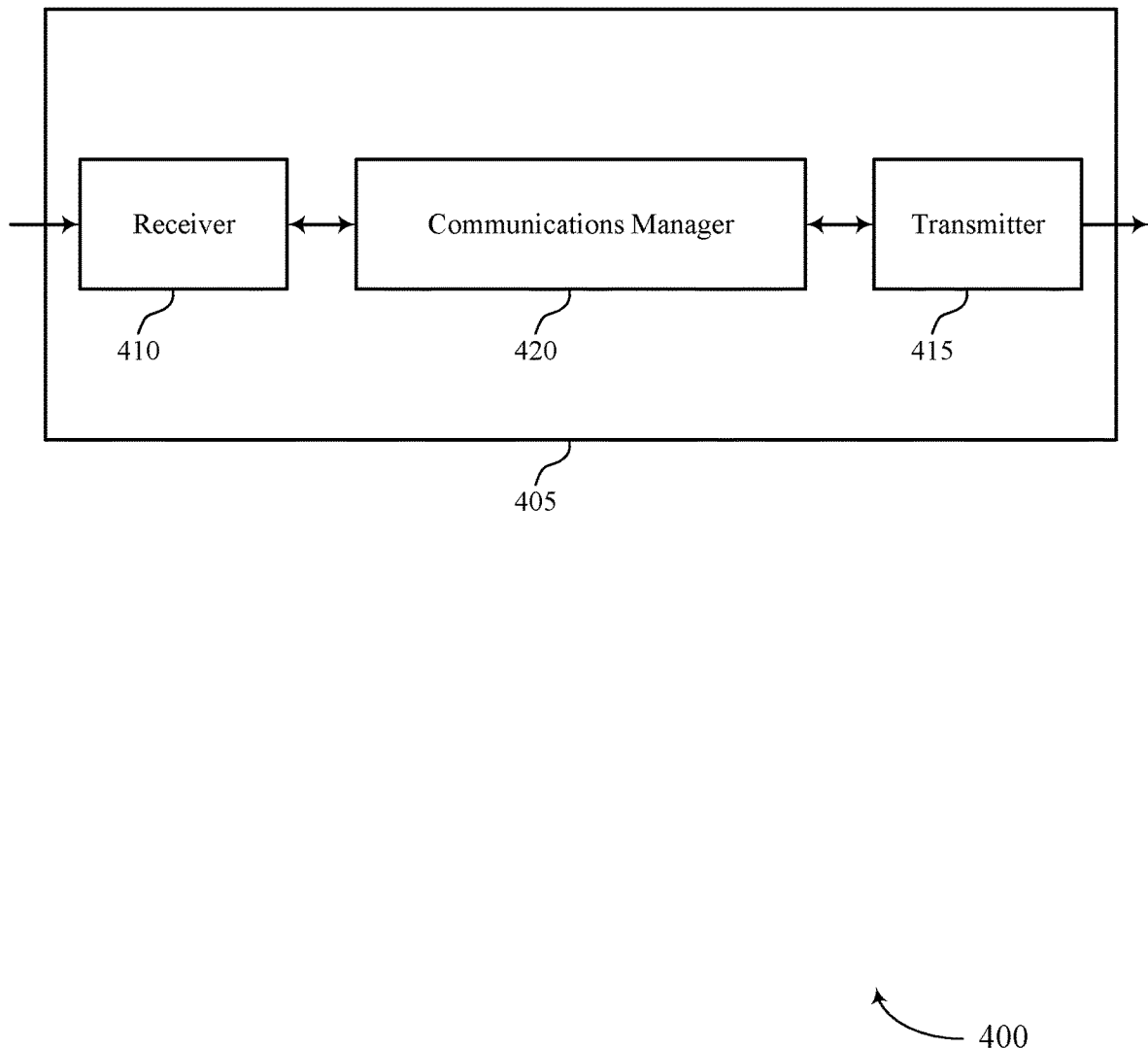
FIGS. 4 and 5 show block diagrams of devices that support space division multiplexing of reference signals in accordance with aspects of the present disclosure.

FIG. 4 shows a block diagram 400 of a device 405 that supports space division multiplexing of reference signals in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to space division multiplexing of reference signals). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to space division multiplexing of reference signals). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of space division multiplexing of reference signals as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, signaling that indicates a transmission pattern for a set of multiple transmit beams associated with two or more SSBs, where the transmission pattern corresponds to sets of two or more concurrently transmitted beams within the set of multiple transmit beams. The communications manager 420 may be configured as or otherwise support a means for monitoring for a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The communications manager 420 may be configured as or otherwise support a means for transmitting CSI to the base station based on monitoring for the set of multiple reference signals.

The actions performed by the communications manager 420, among other examples herein, may be implemented to realize one or more potential advantages. For example, communications manager 420 may increase available battery power and communication quality at a wireless device (e.g., a UE 115) by supporting concurrent transmission of reference signals for channel estimation, which may increase communication quality at the wireless device by increasing beam performance. The associated increase in communication quality may result in increased link performance and decreased overhead based on performing the channel estimation. Accordingly, communications manager 420 may save power and increase battery life at a wireless device (e.g., a UE 115) by strategically increasing a quality of communications at a wireless device (e.g., a UE 115).

Figure 5:
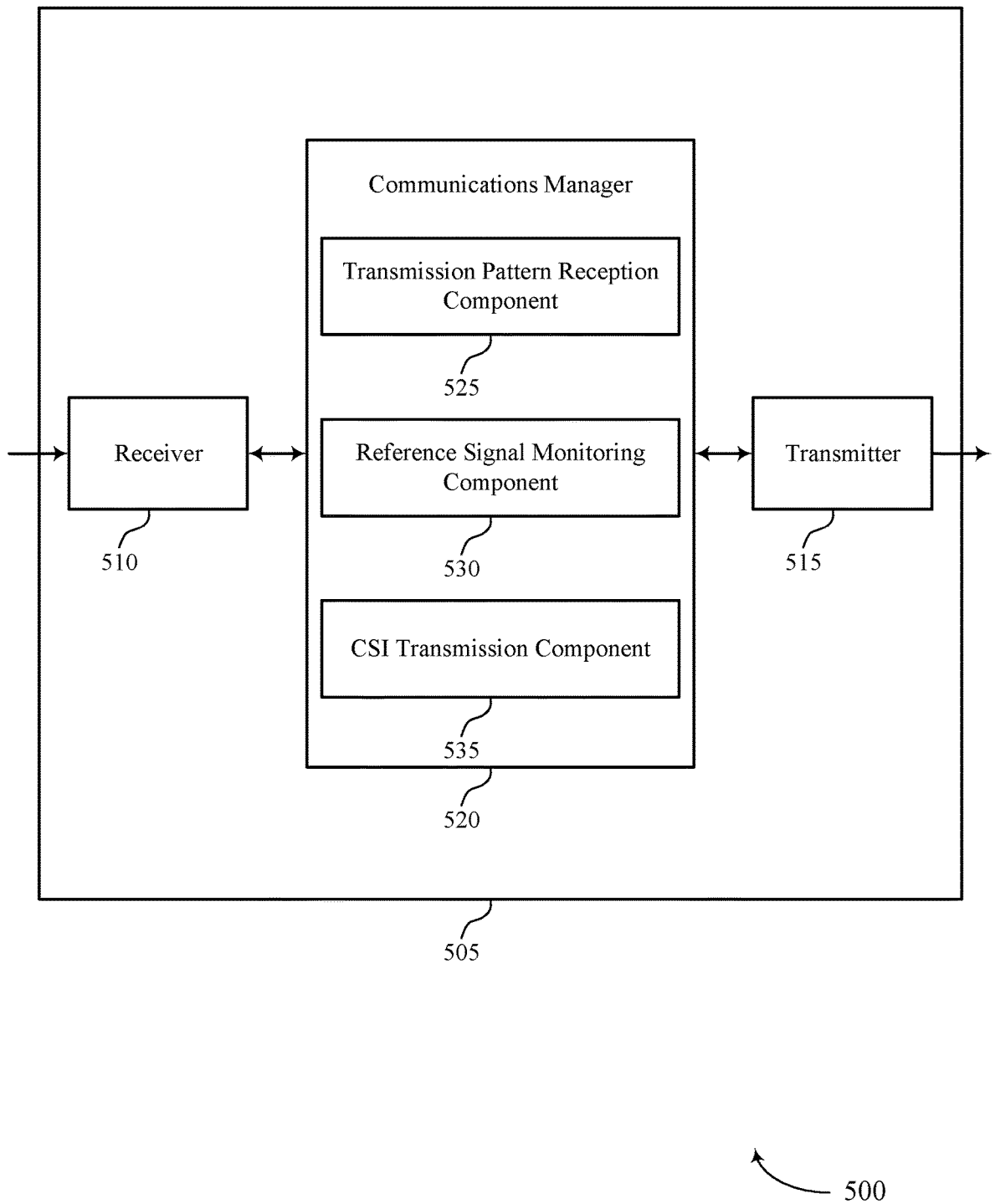

FIG. 5 shows a block diagram 500 of a device 505 that supports space division multiplexing of reference signals in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to space division multiplexing of reference signals). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to space division multiplexing of reference signals). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of space division multiplexing of reference signals as described herein. For example, the communications manager 520 may include a transmission pattern reception component 525, a reference signal monitoring component 530, a CSI transmission component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The transmission pattern reception component 525 may be configured as or otherwise support a means for receiving, from a base station, signaling that indicates a transmission pattern for a set of multiple transmit beams associated with two or more SSBs, where the transmission pattern corresponds to sets of two or more concurrently transmitted beams within the set of multiple transmit beams. The reference signal monitoring component 530 may be configured as or otherwise support a means for monitoring for a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The CSI transmission component 535 may be configured as or otherwise support a means for transmitting CSI to the base station based on monitoring for the set of multiple reference signals.

A processor of a wireless device (e.g., controlling the receiver 510, the transmitter 515, or the transceiver 715 as described with reference to FIG. 7) may increase available battery power and communication quality. The increased communication quality may increase available battery power and throughput (e.g., via implementation of system components described with reference to FIG. 6) compared to other systems and techniques, for example, that do not support concurrent transmission of reference signals for channel estimation. Further, the processor of the wireless device may identify one or more aspects of a pattern for concurrent transmission of the reference signals, which may result in increased communication quality, as well as save power and increase battery life at the wireless device (e.g., by strategically supporting a higher order of channel estimation), among other benefits.

Figure 6:
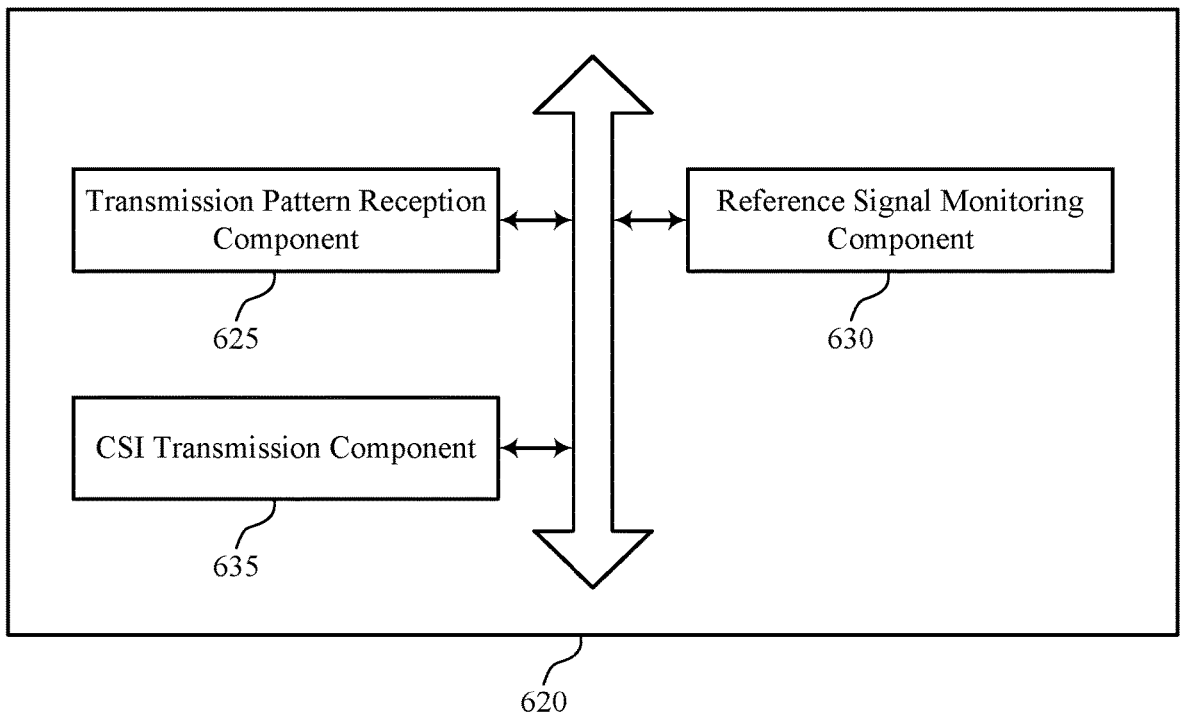
FIG. 6 shows a block diagram of a communications manager that supports space division multiplexing of reference signals in accordance with aspects of the present disclosure.

FIG. 6 shows a block diagram 600 of a communications manager 620 that supports space division multiplexing of reference signals in accordance with aspects of the present disclosure. The communications manager 620 may be an example of aspects of a communications manager 420, a communications manager 520, or both, as described herein. The communications manager 620, or various components thereof, may be an example of means for performing various aspects of space division multiplexing of reference signals as described herein. For example, the communications manager 620 may include a transmission pattern reception component 625, a reference signal monitoring component 630, a CSI transmission component 635, or any combination thereof. Each of these components may communicate, directly or indirectly, with one another (e.g., via one or more buses).

The communications manager 620 may support wireless communication at a UE in accordance with examples as disclosed herein. The transmission pattern reception component 625 may be configured as or otherwise support a means for receiving, from a base station, signaling that indicates a transmission pattern for a set of multiple transmit beams associated with two or more SSBs, where the transmission pattern corresponds to sets of two or more concurrently transmitted beams within the set of multiple transmit beams. The reference signal monitoring component 630 may be configured as or otherwise support a means for monitoring for a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The CSI transmission component 635 may be configured as or otherwise support a means for transmitting CSI to the base station based on monitoring for the set of multiple reference signals.

In some examples, to support monitoring for the set of multiple reference signals, the reference signal monitoring component 630 may be configured as or otherwise support a means for monitoring, during a first symbol period, for a first set of two or more reference signals within the set of multiple reference signals and associated with a first set of two or more concurrently transmitted beams within the set of multiple transmit beams. In some examples, to support monitoring for the set of multiple reference signals, the reference signal monitoring component 630 may be configured as or otherwise support a means for monitoring, during a second symbol period, for a second set of two or more reference signals within the set of multiple reference signals and associated with a second set of two or more concurrently transmitted beams within the set of multiple transmit beams.

In some examples, to support receiving the signaling that indicates the transmission pattern, the transmission pattern reception component 625 may be configured as or otherwise support a means for receiving, for each of the set of multiple reference signals, an indication of the respective orthogonal cover code for the reference signal.

In some examples, a set of two or more reference signals within the set of multiple reference signals and associated with a set of two or more concurrently transmitted beams within the set of multiple transmit beams includes a first reference signal associated with a first SSB of the two or more SSBs and a second reference signal associated with a second SSB of the two or more SSBs. In some examples, a set of two or more reference signals within the set of multiple reference signals and associated with a set of two or more concurrently transmitted beams within the set of multiple transmit beams includes at least two reference signals associated with a same SSB within the two or more SSBs.

In some examples, to support receiving the signaling that indicates the transmission pattern, the transmission pattern reception component 625 may be configured as or otherwise support a means for receiving, for each of the set of multiple transmit beams, an indication of a corresponding reference signal of the set of multiple reference signals. In some examples, one or more dimensions of a channel matrix associated with the CSI are based on a total number of receive antenna ports of the UE, a total number of transmit antenna ports of the base station, or both.

In some examples, to support receiving the signaling that indicates the transmission pattern, the transmission pattern reception component 625 may be configured as or otherwise support a means for receiving DCI, a MAC CE, RRC signaling, or any combination thereof that indicates the transmission pattern.

Figure 7:
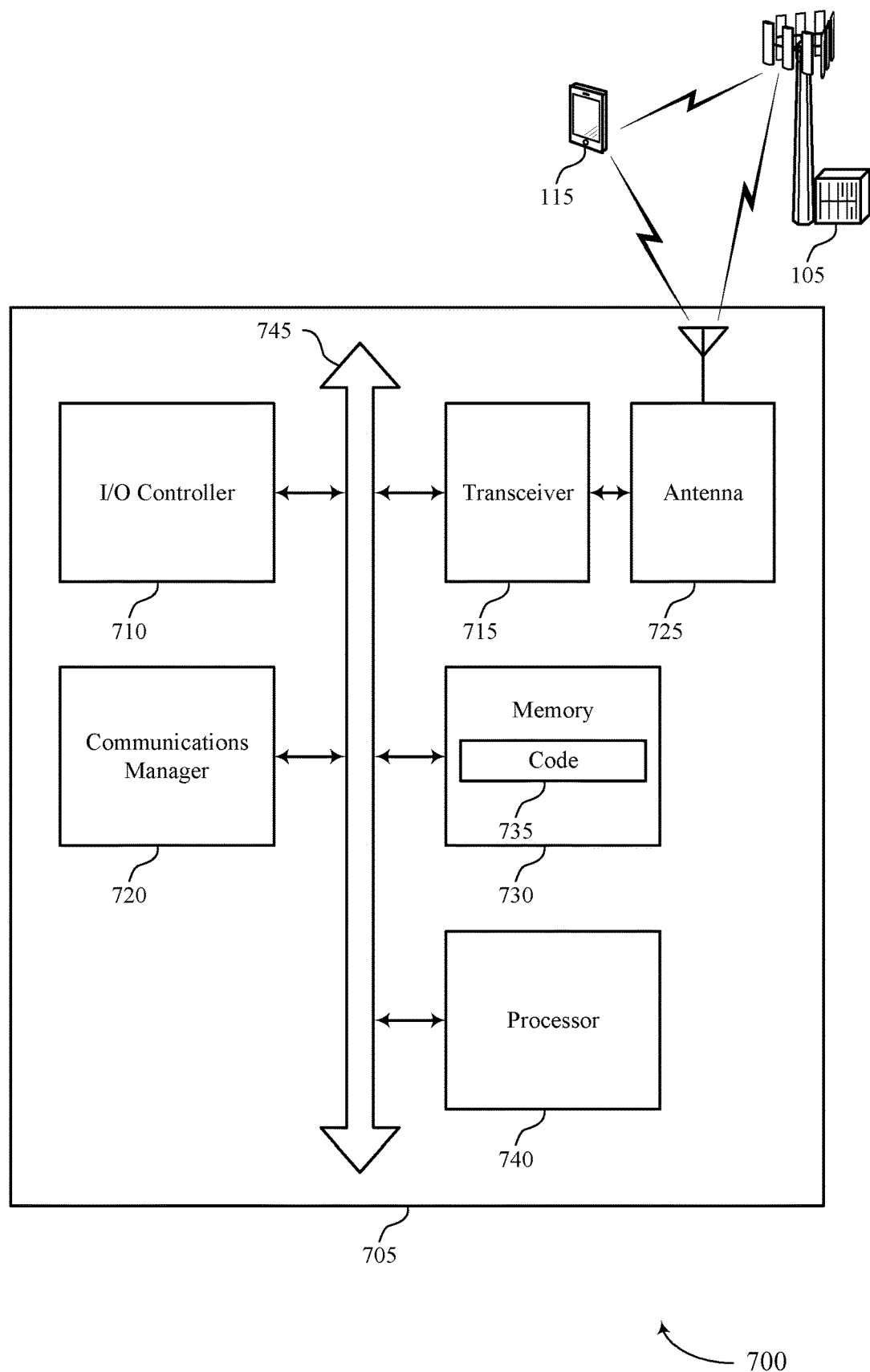
FIG. 7 shows a diagram of a system including a device that supports space division multiplexing of reference signals in accordance with aspects of the present disclosure.

FIG. 7 shows a diagram of a system 700 including a device 705 that supports space division multiplexing of reference signals in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting space division multiplexing of reference signals). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, signaling that indicates a transmission pattern for a set of multiple transmit beams associated with two or more SSBs, where the transmission pattern corresponds to sets of two or more concurrently transmitted beams within the set of multiple transmit beams. The communications manager 720 may be configured as or otherwise support a means for monitoring for a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The communications manager 720 may be configured as or otherwise support a means for transmitting CSI to the base station based on monitoring for the set of multiple reference signals.

In some examples, the communications manager 720 may be configured to perform various operations (e.g., receiving, monitoring, transmitting) using or otherwise in cooperation with the transceiver 715, the one or more antennas 725, or any combination thereof. For example, the communications manager 720 may be configured to receive or transmit messages or other signaling as described herein via the transceiver 715. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of space division multiplexing of reference signals as described herein, or the processor 740 and the memory 730 may be otherwise configured to perform or support such operations.

Figure 8:
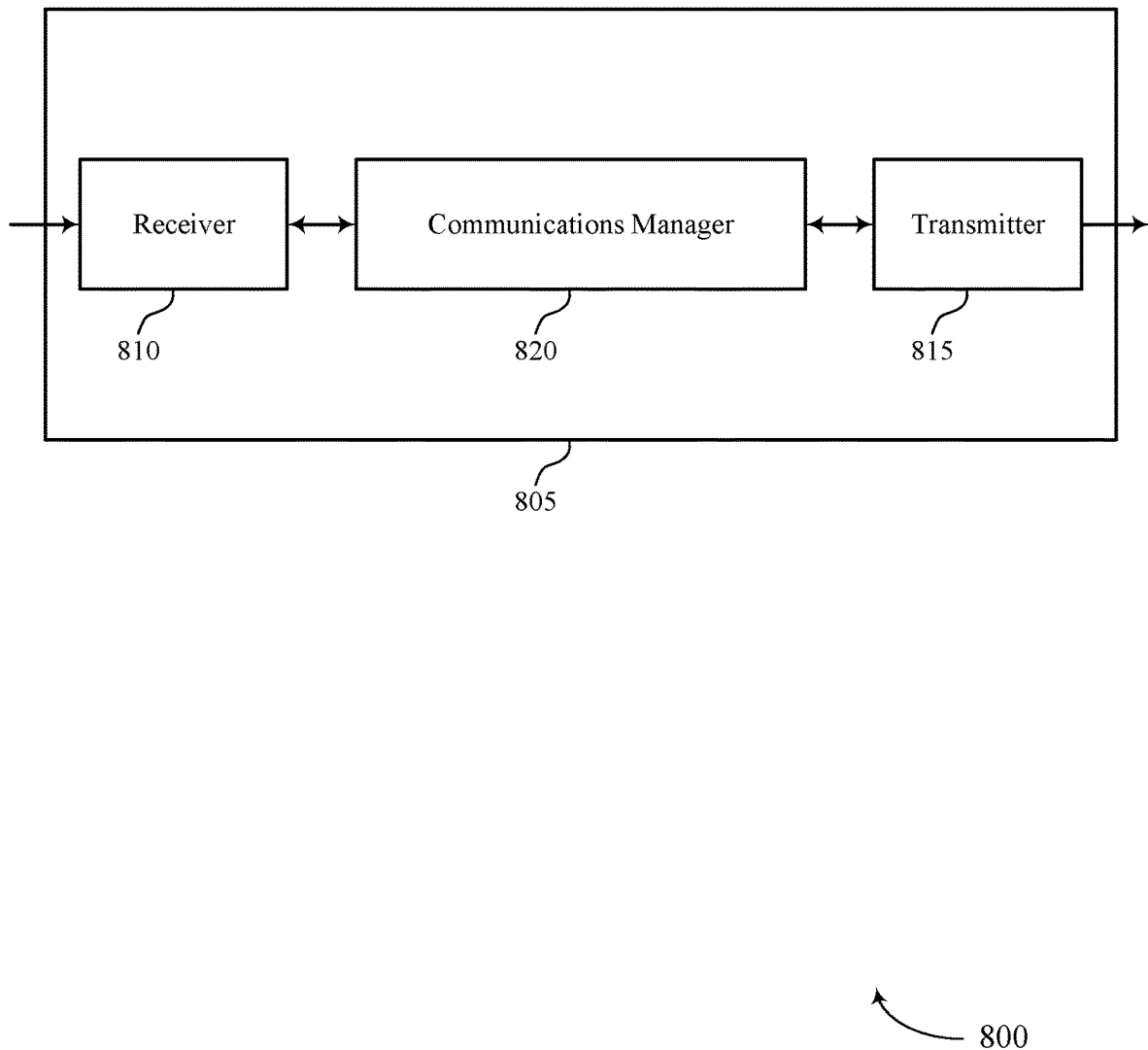
FIGS. 8 and 9 show block diagrams of devices that support space division multiplexing of reference signals in accordance with aspects of the present disclosure.

FIG. 8 shows a block diagram 800 of a device 805 that supports space division multiplexing of reference signals in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to space division multiplexing of reference signals). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to space division multiplexing of reference signals). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of space division multiplexing of reference signals as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, signaling that indicates a transmission pattern for a set of multiple transmit beams associated with two or more SSBs, where the transmission pattern corresponds to sets of two or more concurrently transmitted beams within the set of multiple transmit beams. The communications manager 820 may be configured as or otherwise support a means for transmitting a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The communications manager 820 may be configured as or otherwise support a means for receiving CSI from the UE based on transmitting the set of multiple reference signals.

Figure 9:
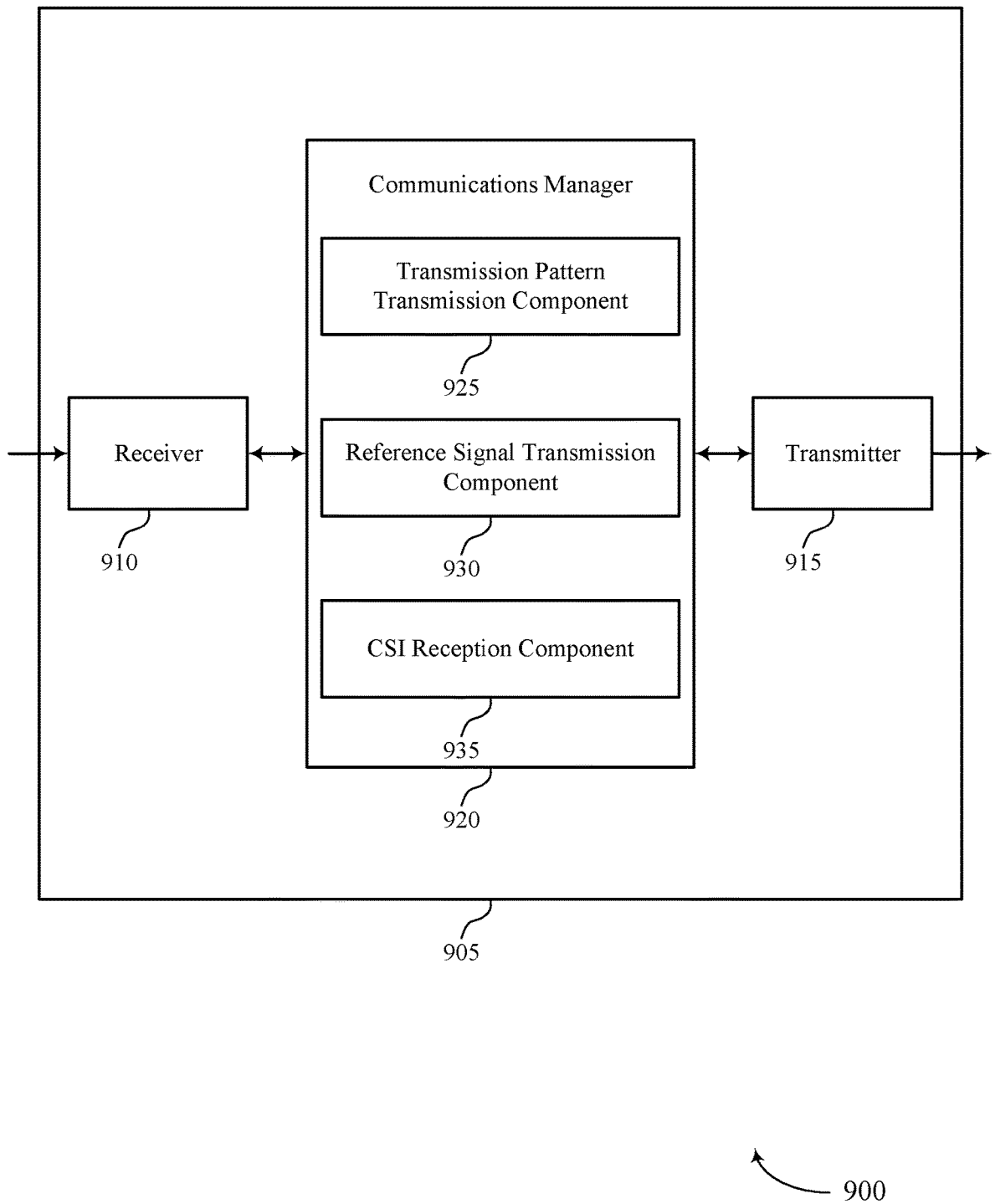

FIG. 9 shows a block diagram 900 of a device 905 that supports space division multiplexing of reference signals in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to space division multiplexing of reference signals). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to space division multiplexing of reference signals). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of space division multiplexing of reference signals as described herein. For example, the communications manager 920 may include a transmission pattern transmission component 925, a reference signal transmission component 930, a CSI reception component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The transmission pattern transmission component 925 may be configured as or otherwise support a means for transmitting, to a UE, signaling that indicates a transmission pattern for a set of multiple transmit beams associated with two or more SSBs, where the transmission pattern corresponds to sets of two or more concurrently transmitted beams within the set of multiple transmit beams. The reference signal transmission component 930 may be configured as or otherwise support a means for transmitting a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The CSI reception component 935 may be configured as or otherwise support a means for receiving CSI from the UE based on transmitting the set of multiple reference signals.

Figure 10:
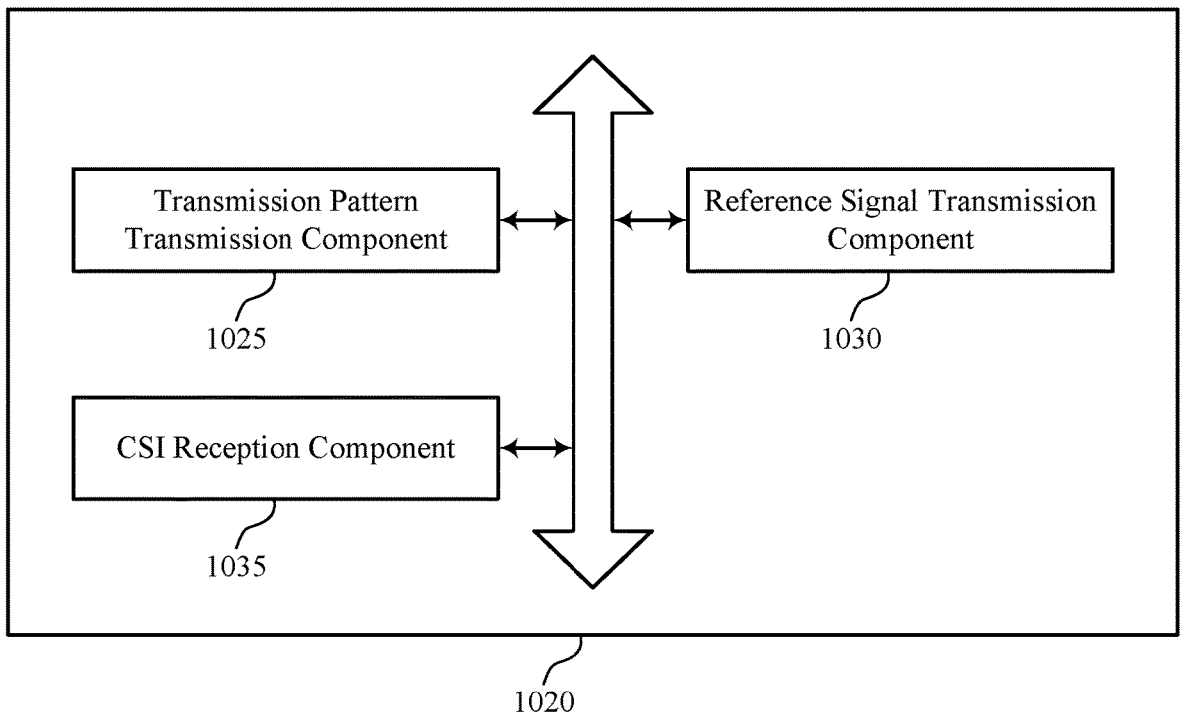
FIG. 10 shows a block diagram of a communications manager that supports space division multiplexing of reference signals in accordance with aspects of the present disclosure.

FIG. 10 shows a block diagram 1000 of a communications manager 1020 that supports space division multiplexing of reference signals in accordance with aspects of the present disclosure. The communications manager 1020 may be an example of aspects of a communications manager 820, a communications manager 920, or both, as described herein. The communications manager 1020, or various components thereof, may be an example of means for performing various aspects of space division multiplexing of reference signals as described herein. For example, the communications manager 1020 may include a transmission pattern transmission component 1025, a reference signal transmission component 1030, a CSI reception component 1035, or any combination thereof. Each of these components may communicate, directly or indirectly, with one another (e.g., via one or more buses).

The communications manager 1020 may support wireless communication at a base station in accordance with examples as disclosed herein. The transmission pattern transmission component 1025 may be configured as or otherwise support a means for transmitting, to a UE, signaling that indicates a transmission pattern for a set of multiple transmit beams associated with two or more SSBs, where the transmission pattern corresponds to sets of two or more concurrently transmitted beams within the set of multiple transmit beams. The reference signal transmission component 1030 may be configured as or otherwise support a means for transmitting a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The CSI reception component 1035 may be configured as or otherwise support a means for receiving CSI from the UE based on transmitting the set of multiple reference signals.

In some examples, to support transmitting the set of multiple reference signals, the reference signal transmission component 1030 may be configured as or otherwise support a means for transmitting, during a first symbol period, a first set of two or more reference signals within the set of multiple reference signals and associated with a first set of two or more concurrently transmitted beams within the set of multiple transmit beams. In some examples, to support transmitting the set of multiple reference signals, the reference signal transmission component 1030 may be configured as or otherwise support a means for transmitting, during a second symbol period, a second set of two or more reference signals within the set of multiple reference signals and associated with a second set of two or more concurrently transmitted beams within the set of multiple transmit beams.

In some examples, to support transmitting the signaling that indicates the transmission pattern, the transmission pattern transmission component 1025 may be configured as or otherwise support a means for transmitting, for each of the set of multiple reference signals, an indication of the respective orthogonal cover code for the reference signal.

In some examples, a set of two or more reference signals within the set of multiple reference signals and associated with a set of two or more concurrently transmitted beams within the set of multiple transmit beams includes a first reference signal associated with a first SSB of the two or more SSBs and a second reference signal associated with a second SSB of the two or more SSBs. In some examples, a set of two or more reference signals within the set of multiple reference signals and associated with a set of two or more concurrently transmitted beams within the set of multiple transmit beams includes at least two reference signals associated with a same SSB within the two or more SSBs.

In some examples, to support transmitting the signaling that indicates the transmission pattern, the transmission pattern transmission component 1025 may be configured as or otherwise support a means for transmitting, for each of the set of multiple transmit beams, an indication of a corresponding reference signal of the set of multiple reference signals. In some examples, one or more dimension of a channel matrix associated with the CSI are based on a total number of receive antenna ports of the UE, a total number of transmit antenna ports of the base station, or both.

In some examples, to support transmitting the signaling that indicates the transmission pattern, the transmission pattern transmission component 1025 may be configured as or otherwise support a means for transmitting DCI, a MAC CE, RRC signaling, or any combination thereof that indicates the transmission pattern.

Figure 11:
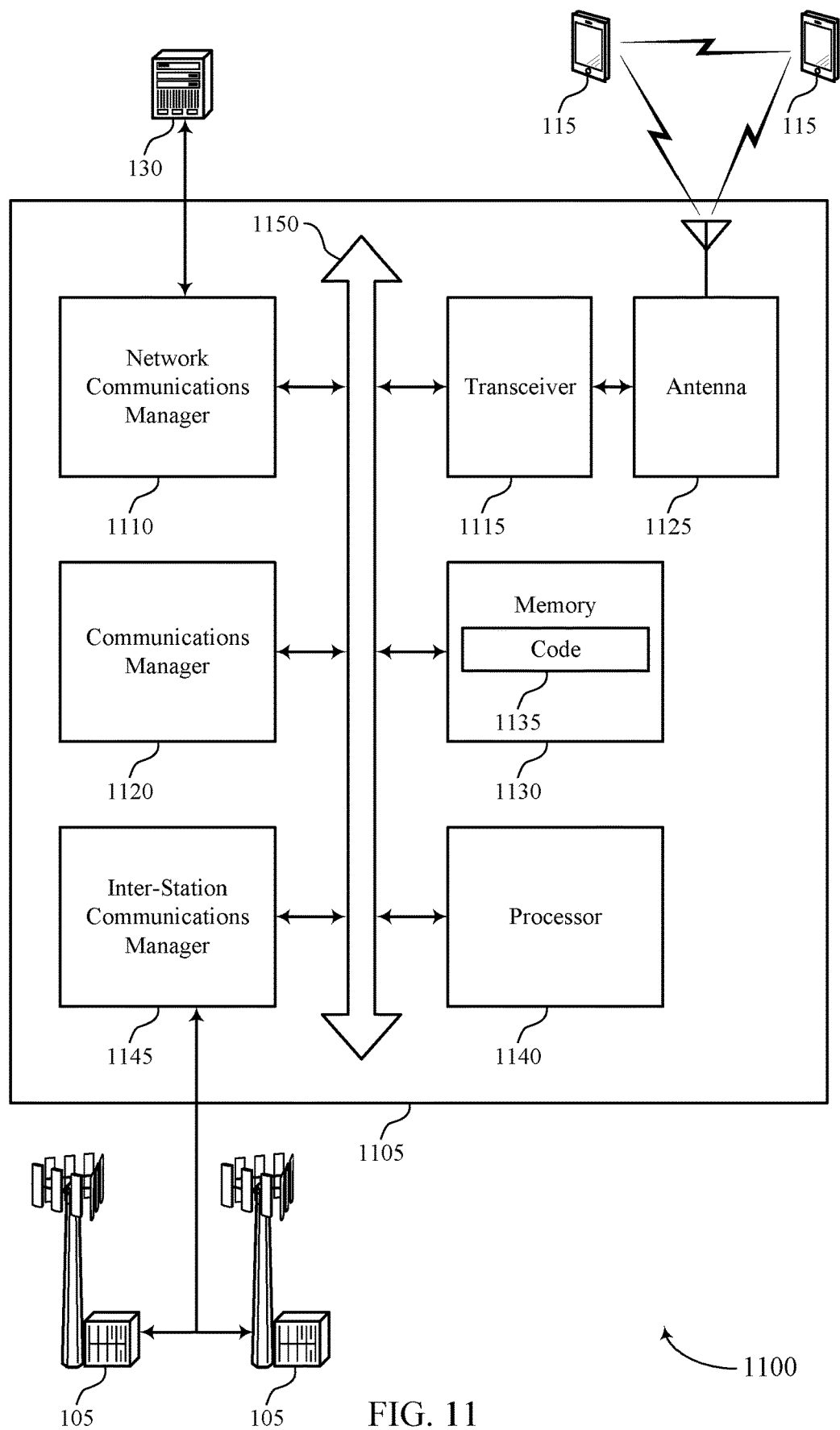
FIG. 11 shows a diagram of a system including a device that supports space division multiplexing of reference signals in accordance with aspects of the present disclosure.

FIG. 11 shows a diagram of a system 1100 including a device 1105 that supports space division multiplexing of reference signals in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting space division multiplexing of reference signals). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, signaling that indicates a transmission pattern for a set of multiple transmit beams associated with two or more SSBs, where the transmission pattern corresponds to sets of two or more concurrently transmitted beams within the set of multiple transmit beams. The communications manager 1120 may be configured as or otherwise support a means for transmitting a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The communications manager 1120 may be configured as or otherwise support a means for receiving CSI from the UE based on transmitting the set of multiple reference signals.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signaling as described herein via the transceiver 1115. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of space division multiplexing of reference signals as described herein, or the processor 1140 and the memory 1130 may be otherwise configured to perform or support such operations.

Figure 12:
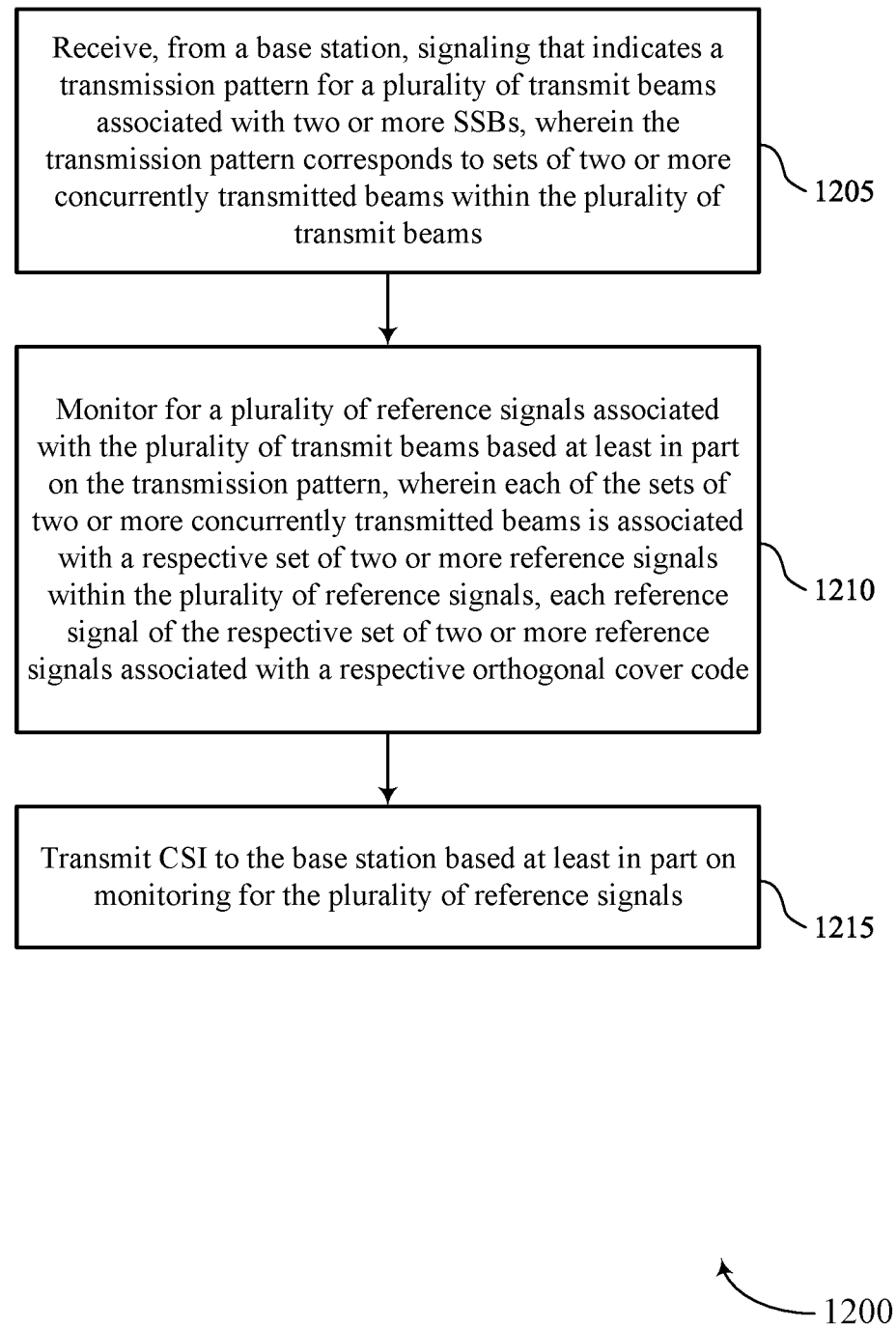
FIGS. 12 through 15 show flowcharts illustrating methods that support space division multiplexing of reference signals in accordance with aspects of the present disclosure.

FIG. 12 shows a flowchart illustrating a method 1200 that supports space division multiplexing of reference signals in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, signaling that indicates a transmission pattern for a set of multiple transmit beams associated with two or more SSBs, where the transmission pattern corresponds to sets of two or more concurrently transmitted beams within the set of multiple transmit beams. The operations of 1205 may be performed in accordance with examples as disclosed herein. In some examples, aspects of the operations of 1205 may be performed by a transmission pattern reception component 625 as described with reference to FIG. 6. Additionally or alternatively, means for performing 1205 may, but not necessarily, include, for example, antenna 725, transceiver 715, communications manager 720, memory 730 (including code 735), processor 740 and/or bus 745.

At 1210, the method may include monitoring for a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The operations of 1210 may be performed in accordance with examples as disclosed herein. In some examples, aspects of the operations of 1210 may be performed by a reference signal monitoring component 630 as described with reference to FIG. 6. Additionally or alternatively, means for performing 1210 may, but not necessarily, include, for example, antenna 725, transceiver 715, communications manager 720, memory 730 (including code 735), processor 740 and/or bus 745.

At 1215, the method may include transmitting CSI to the base station based on monitoring for the set of multiple reference signals. The operations of 1215 may be performed in accordance with examples as disclosed herein. In some examples, aspects of the operations of 1215 may be performed by a CSI transmission component 635 as described with reference to FIG. 6. Additionally or alternatively, means for performing 1215 may, but not necessarily, include, for example, antenna 725, transceiver 715, communications manager 720, memory 730 (including code 735), processor 740 and/or bus 745.

Figure 13:
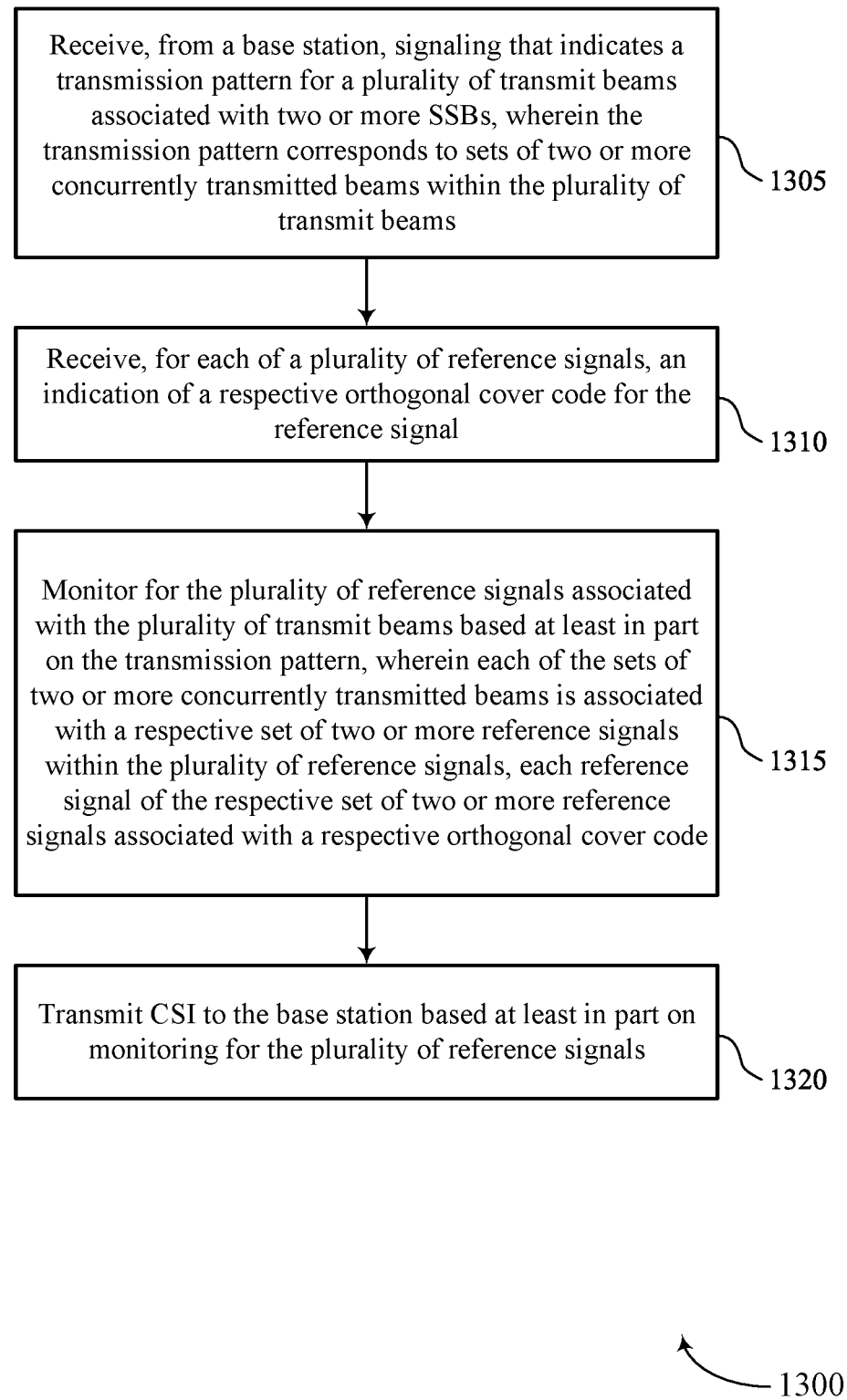

FIG. 13 shows a flowchart illustrating a method 1300 that supports space division multiplexing of reference signals in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, signaling that indicates a transmission pattern for a set of multiple transmit beams associated with two or more SSBs, where the transmission pattern corresponds to sets of two or more concurrently transmitted beams within the set of multiple transmit beams. The operations of 1305 may be performed in accordance with examples as disclosed herein. In some examples, aspects of the operations of 1305 may be performed by a transmission pattern reception component 625 as described with reference to FIG. 6. Additionally or alternatively, means for performing 1305 may, but not necessarily, include, for example, antenna 725, transceiver 715, communications manager 720, memory 730 (including code 735), processor 740 and/or bus 745.

At 1310, the method may include receiving, for each of a set of multiple reference signals, an indication of a respective orthogonal cover code for the reference signal. The operations of 1310 may be performed in accordance with examples as disclosed herein. In some examples, aspects of the operations of 1310 may be performed by a transmission pattern reception component 625 as described with reference to FIG. 6. Additionally or alternatively, means for performing 1310 may, but not necessarily, include, for example, antenna 725, transceiver 715, communications manager 720, memory 730 (including code 735), processor 740 and/or bus 745.

At 1315, the method may include monitoring for the set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The operations of 1315 may be performed in accordance with examples as disclosed herein. In some examples, aspects of the operations of 1315 may be performed by a reference signal monitoring component 630 as described with reference to FIG. 6. Additionally or alternatively, means for performing 1315 may, but not necessarily, include, for example, antenna 725, transceiver 715, communications manager 720, memory 730 (including code 735), processor 740 and/or bus 745.

At 1320, the method may include transmitting CSI to the base station based on monitoring for the set of multiple reference signals. The operations of 1320 may be performed in accordance with examples as disclosed herein. In some examples, aspects of the operations of 1320 may be performed by a CSI transmission component 635 as described with reference to FIG. 6. Additionally or alternatively, means for performing 1320 may, but not necessarily, include, for example, antenna 725, transceiver 715, communications manager 720, memory 730 (including code 735), processor 740 and/or bus 745.

Figure 14:
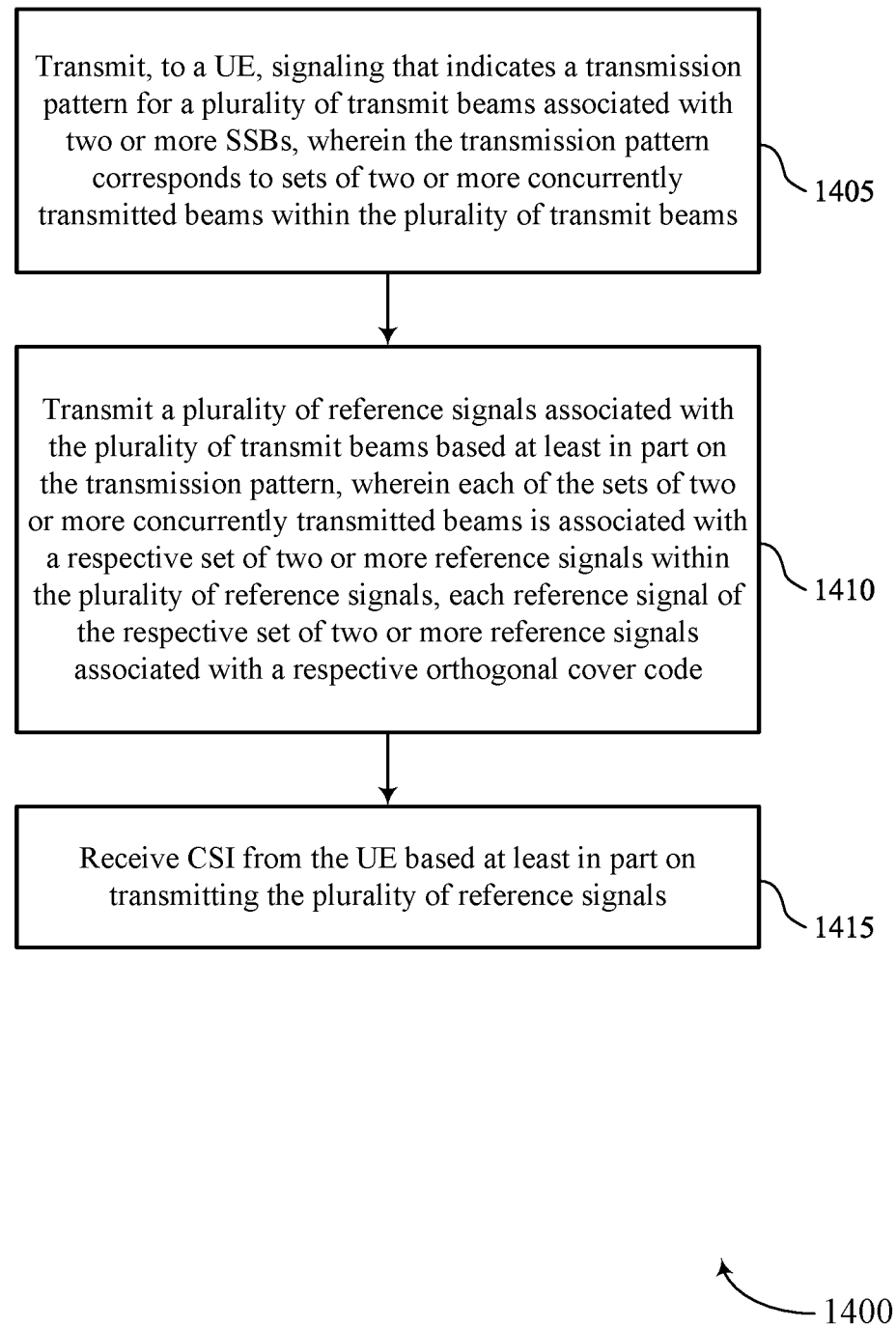

FIG. 14 shows a flowchart illustrating a method 1400 that supports space division multiplexing of reference signals in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include transmitting, to a UE, signaling that indicates a transmission pattern for a set of multiple transmit beams associated with two or more SSBs, where the transmission pattern corresponds to sets of two or more concurrently transmitted beams within the set of multiple transmit beams. The operations of 1405 may be performed in accordance with examples as disclosed herein. In some examples, aspects of the operations of 1405 may be performed by a transmission pattern transmission component 1025 as described with reference to FIG. 10. Additionally or alternatively, means for performing 1405 may, but not necessarily, include, for example, antenna 1125, transceiver 1115, communications manager 1110, memory 1130 (including code 1135), processor 1140 and/or bus 1150.

At 1410, the method may include transmitting a set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The operations of 1410 may be performed in accordance with examples as disclosed herein. In some examples, aspects of the operations of 1410 may be performed by a reference signal transmission component 1030 as described with reference to FIG. 10. Additionally or alternatively, means for performing 1410 may, but not necessarily, include, for example, antenna 1125, transceiver 1115, communications manager 1110, memory 1130 (including code 1135), processor 1140 and/or bus 1150.

At 1415, the method may include receiving CSI from the UE based on transmitting the set of multiple reference signals. The operations of 1415 may be performed in accordance with examples as disclosed herein. In some examples, aspects of the operations of 1415 may be performed by a CSI reception component 1035 as described with reference to FIG. 10. Additionally or alternatively, means for performing 1415 may, but not necessarily, include, for example, antenna 1125, transceiver 1115, communications manager 1110, memory 1130 (including code 1135), processor 1140 and/or bus 1150.

Figure 15:
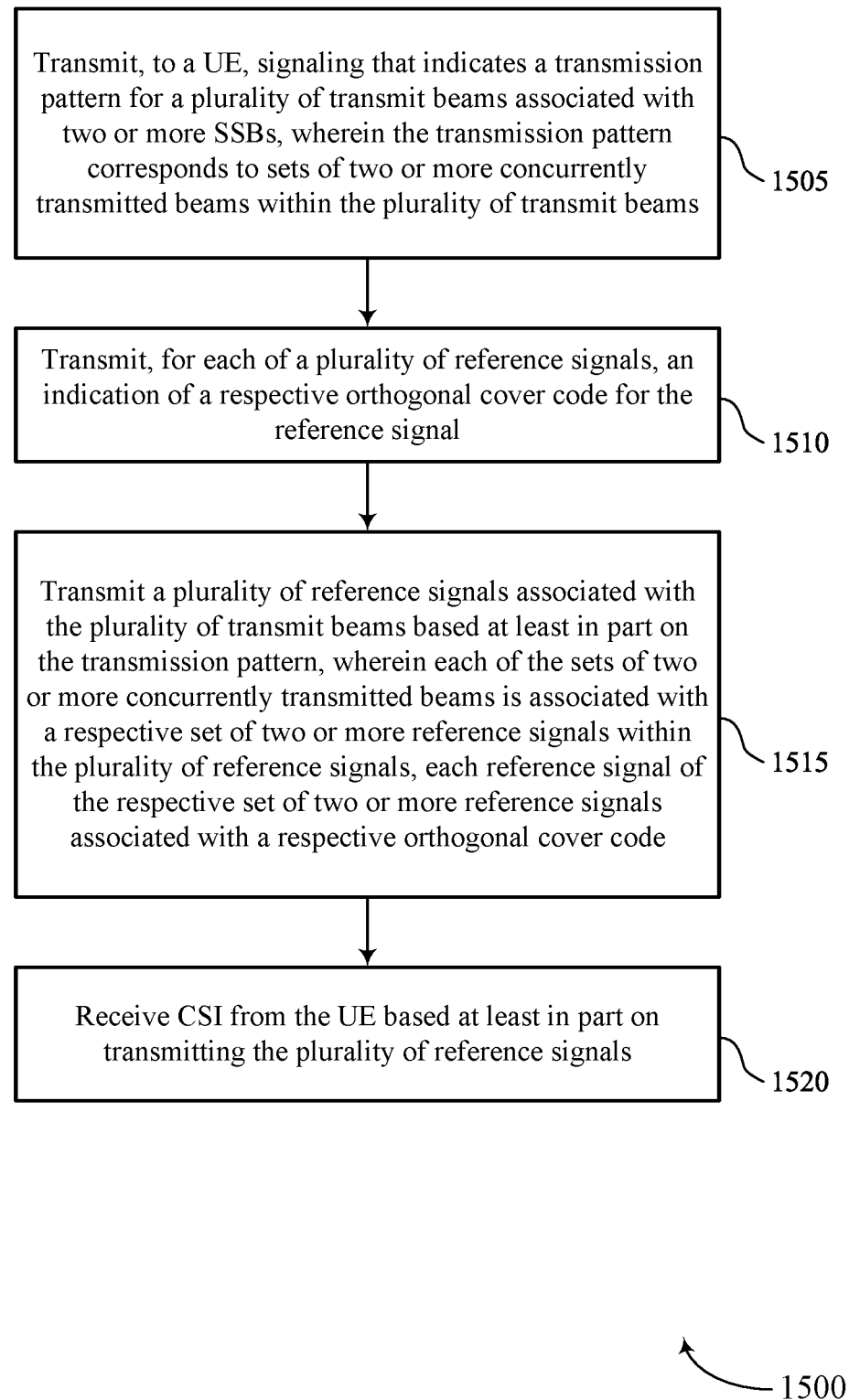

FIG. 15 shows a flowchart illustrating a method 1500 that supports space division multiplexing of reference signals in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, signaling that indicates a transmission pattern for a set of multiple transmit beams associated with two or more SSBs, where the transmission pattern corresponds to sets of two or more concurrently transmitted beams within the set of multiple transmit beams. The operations of 1505 may be performed in accordance with examples as disclosed herein. In some examples, aspects of the operations of 1505 may be performed by a transmission pattern transmission component 1025 as described with reference to FIG. 10. Additionally or alternatively, means for performing 1505 may, but not necessarily, include, for example, antenna 1125, transceiver 1115, communications manager 1110, memory 1130 (including code 1135), processor 1140 and/or bus 1150.

At 1510, the method may include transmitting, for each of a set of multiple reference signals, an indication of a respective orthogonal cover code for the reference signal. The operations of 1510 may be performed in accordance with examples as disclosed herein. In some examples, aspects of the operations of 1510 may be performed by a transmission pattern transmission component 1025 as described with reference to FIG. 10. Additionally or alternatively, means for performing 1510 may, but not necessarily, include, for example, antenna 1125, transceiver 1115, communications manager 1110, memory 1130 (including code 1135), processor 1140 and/or bus 1150.

At 1515, the method may include transmitting the set of multiple reference signals associated with the set of multiple transmit beams based on the transmission pattern, where each of the sets of two or more concurrently transmitted beams is associated with a respective set of two or more reference signals within the set of multiple reference signals, each reference signal of the respective set of two or more reference signals associated with a respective orthogonal cover code. The operations of 1515 may be performed in accordance with examples as disclosed herein. In some examples, aspects of the operations of 1515 may be performed by a reference signal transmission component 1030 as described with reference to FIG. 10. Additionally or alternatively, means for performing 1515 may, but not necessarily, include, for example, antenna 1125, transceiver 1115, communications manager 1110, memory 1130 (including code 1135), processor 1140 and/or bus 1150.

At 1520, the method may include receiving CSI from the UE based on transmitting the set of multiple reference signals. The operations of 1520 may be performed in accordance with examples as disclosed herein. In some examples, aspects of the operations of 1520 may be performed by a CSI reception component 1035 as described with reference to FIG. 10. Additionally or alternatively, means for performing 1520 may, but not necessarily, include, for example, antenna 1125, transceiver 1115, communications manager 1110, memory 1130 (including code 1135), processor 1140 and/or bus 1150.

The following provides an overview of aspects of the present disclosure:

Aspect 1: A method for wireless communication at a UE, comprising: receiving, from a base station, signaling that indicates a transmission pattern for a plurality of transmit beams associated with two or more SSBs, wherein the transmission pattern corresponds to sets of two or more concurrently transmitted beams within the plurality of transmit beams; monitoring for a plurality of reference signals associated with the plurality of transmit beams based at least in part on the transmission pattern, wherein each of the sets of two or more concurrently transmitted beams is associated with a respective set of two or more reference signals within the plurality of reference signals, each reference signal of the respective set of two or more reference signals associated with a respective orthogonal cover code; and transmitting CSI to the base station based at least in part on monitoring for the plurality of reference signals.

Aspect 2: The method of aspect 1, wherein monitoring for the plurality of reference signals comprises: monitoring, during a first symbol period, for a first set of two or more reference signals within the plurality of reference signals and associated with a first set of two or more concurrently transmitted beams within the plurality of transmit beams; and monitoring, during a second symbol period, for a second set of two or more reference signals within the plurality of reference signals and associated with a second set of two or more concurrently transmitted beams within the plurality of transmit beams.

Aspect 3: The method of any of aspects 1 through 2, wherein receiving the signaling that indicates the transmission pattern comprises: receiving, for each of the plurality of reference signals, an indication of the respective orthogonal cover code for the reference signal.

Aspect 4: The method of any of aspects 1 through 3, wherein a set of two or more reference signals within the plurality of reference signals and associated with a set of two or more concurrently transmitted beams within the plurality of transmit beams comprises a first reference signal associated with a first SSB of the two or more SSBs and a second reference signal associated with a second SSB of the two or more SSBs.

Aspect 5: The method of any of aspects 1 through 4, wherein a set of two or more reference signals within the plurality of reference signals and associated with a set of two or more concurrently transmitted beams within the plurality of transmit beams comprises at least two reference signals associated with a same SSB within the two or more SSBs.

Aspect 6: The method of any of aspects 1 through 5, wherein receiving the signaling that indicates the transmission pattern comprises: receiving, for each of the plurality of transmit beams, an indication of a corresponding reference signal of the plurality of reference signals.

Aspect 7: The method of any of aspects 1 through 6, wherein dimensions of a channel associated with the CSI are based at least in part on a total number of receive antenna ports of the UE and a total number of transmit antenna ports of the base station.

Aspect 8: The method of any of aspects 1 through 7, wherein receiving the signaling that indicates the transmission pattern comprises: receiving DCI, a MAC CE, RRC signaling, or any combination thereof that indicates the transmission pattern.

Aspect 9: A method for wireless communication at a base station, comprising: transmitting, to a UE, signaling that indicates a transmission pattern for a plurality of transmit beams associated with two or more SSBs, wherein the transmission pattern corresponds to sets of two or more concurrently transmitted beams within the plurality of transmit beams; transmitting a plurality of reference signals associated with the plurality of transmit beams based at least in part on the transmission pattern, wherein each of the sets of two or more concurrently transmitted beams is associated with a respective set of two or more reference signals within the plurality of reference signals, each reference signal of the respective set of two or more reference signals associated with a respective orthogonal cover code; and receiving CSI from the UE based at least in part on transmitting the plurality of reference signals.

Aspect 10: The method of aspect 9, wherein transmitting the plurality of reference signals comprises: transmitting, during a first symbol period, a first set of two or more reference signals within the plurality of reference signals and associated with a first set of two or more concurrently transmitted beams within the plurality of transmit beams; and transmitting, during a second symbol period, a second set of two or more reference signals within the plurality of reference signals and associated with a second set of two or more concurrently transmitted beams within the plurality of transmit beams.

Aspect 11: The method of any of aspects 9 through 10, wherein transmitting the signaling that indicates the transmission pattern comprises: transmitting, for each of the plurality of reference signals, an indication of the respective orthogonal cover code for the reference signal.

Aspect 12: The method of any of aspects 9 through 11, wherein a set of two or more reference signals within the plurality of reference signals and associated with a set of two or more concurrently transmitted beams within the plurality of transmit beams comprises a first reference signal associated with a first SSB of the two or more SSBs and a second reference signal associated with a second SSB of the two or more SSBs.

Aspect 13: The method of any of aspects 9 through 12, wherein a set of two or more reference signals within the plurality of reference signals and associated with a set of two or more concurrently transmitted beams within the plurality of transmit beams comprises at least two reference signals associated with a same SSB within the two or more SSBs.

Aspect 14: The method of any of aspects 9 through 13, wherein transmitting the signaling that indicates the transmission pattern comprises: transmitting, for each of the plurality of transmit beams, an indication of a corresponding reference signal of the plurality of reference signals.

Aspect 15: The method of any of aspects 9 through 14, wherein a dimension of a channel associated with the CSI is based at least in part on a total number of receive antenna ports of the UE and a total number of transmit antenna ports of the base station.

Aspect 16: The method of any of aspects 9 through 15, wherein transmitting the signaling that indicates the transmission pattern comprises: transmitting DCI, a MAC CE, RRC signaling, or any combination thereof that indicates the transmission pattern.

Aspect 17: An apparatus for wireless communication at a UE, comprising a processor; a transceiver coupled with the processor; memory coupled with the processor, the memory and the processor configured to cause the apparatus to perform a method of any of aspects 1 through 8.

Aspect 18: An apparatus for wireless communication at a UE, comprising at least one means for performing a method of any of aspects 1 through 8.

Aspect 19: A non-transitory computer-readable medium storing code for wireless communication at a UE, the code comprising instructions executable by a processor to perform a method of any of aspects 1 through 8.

Aspect 20: An apparatus for wireless communication at a base station, comprising a processor; a transceiver coupled with the processor; memory coupled with the processor, the memory and the processor configured to cause the apparatus to perform a method of any of aspects 9 through 16.

Aspect 21: An apparatus for wireless communication at a base station, comprising at least one means for performing a method of any of aspects 9 through 16.

Aspect 22: A non-transitory computer-readable medium storing code for wireless communication at a base station, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, signaling that indicates a transmission pattern for a plurality of transmit beams associated with two or more synchronization signal blocks, wherein the transmission pattern corresponds to sets of two or more concurrently transmitted beams within the plurality of transmit beams;
   monitoring for a plurality of reference signals associated with the plurality of transmit beams based at least in part on the transmission pattern, wherein:
      each of the sets of two or more concurrently transmitted beams is associated with a respective set of two or more reference signals within the plurality of reference signals, each reference signal of the respective set of two or more reference signals associated with a respective orthogonal cover code; and
      a first reference signal associated with a first synchronization signal block is monitored for concurrently with a second reference signal associated with a second synchronization signal block, the first reference signal and the second reference signal associated with one of the sets of two or more concurrently transmitted beams, and the two or more synchronization signal blocks comprising the first synchronization signal block and the second synchronization signal block; and
   transmitting channel state information to the base station based at least in part on monitoring for the plurality of reference signals.

2. The method of claim 1, wherein monitoring for the plurality of reference signals comprises:
   monitoring, during a first symbol period, for a first set of two or more reference signals within the plurality of reference signals and associated with a first set of two or more concurrently transmitted beams within the plurality of transmit beams; and
   monitoring, during a second symbol period, for a second set of two or more reference signals within the plurality of reference signals and associated with a second set of two or more concurrently transmitted beams within the plurality of transmit beams.

3. The method of claim 1, wherein receiving the signaling that indicates the transmission pattern comprises:
   receiving, for each of the plurality of reference signals, an indication of the respective orthogonal cover code for the reference signal.

4. The method of claim 1, wherein a set of two or more reference signals within the plurality of reference signals and associated with a set of two or more concurrently transmitted beams within the plurality of transmit beams comprises at least two reference signals associated with a same synchronization signal block within the two or more synchronization signal blocks.

5. The method of claim 1, wherein receiving the signaling that indicates the transmission pattern comprises:
   receiving, for each of the plurality of transmit beams, an indication of a corresponding reference signal of the plurality of reference signals.

6. The method of claim 1, wherein one or more dimensions of a channel matrix associated with the channel state information are based at least in part on a total number of receive antenna ports of the UE, a total number of transmit antenna ports of the base station, or both.

7. The method of claim 1, wherein receiving the signaling that indicates the transmission pattern comprises:
   receiving downlink control information, a medium access control-control element, radio resource control signaling, or any combination thereof that indicates the transmission pattern.

8. A method for wireless communication at a base station, comprising:
   transmitting, to a user equipment (UE), signaling that indicates a transmission pattern for a plurality of transmit beams associated with two or more synchronization signal blocks, wherein the transmission pattern corresponds to sets of two or more concurrently transmitted beams within the plurality of transmit beams;
   transmitting a plurality of reference signals associated with the plurality of transmit beams based at least in part on the transmission pattern, wherein:
      each of the sets of two or more concurrently transmitted beams is associated with a respective set of two or more reference signals within the plurality of reference signals, each reference signal of the respective set of two or more reference signals associated with a respective orthogonal cover code; and
      a first reference signal associated with a first synchronization signal block is transmitted concurrently with a second reference signal associated with a second synchronization signal block, the first reference signal and the second reference signal associated with one of the sets of two or more concurrently transmitted beams, and the two or more synchronization signal blocks comprising the first synchronization signal block and the second synchronization signal block; and
   receiving channel state information from the UE based at least in part on transmitting the plurality of reference signals.

9. The method of claim 8, wherein transmitting the plurality of reference signals comprises:
   transmitting, during a first symbol period, a first set of two or more reference signals within the plurality of reference signals and associated with a first set of two or more concurrently transmitted beams within the plurality of transmit beams; and transmitting, during a second symbol period, a second set of two or more reference signals within the plurality of reference signals and associated with a second set of two or more concurrently transmitted beams within the plurality of transmit beams.

10. The method of claim 8, wherein transmitting the signaling that indicates the transmission pattern comprises:
transmitting, for each of the plurality of reference signals, an indication of the respective orthogonal cover code for the reference signal.

11. The method of claim 8, wherein a set of two or more reference signals within the plurality of reference signals and associated with a set of two or more concurrently transmitted beams within the plurality of transmit beams comprises at least two reference signals associated with a same synchronization signal block within the two or more synchronization signal blocks.

12. The method of claim 8, wherein transmitting the signaling that indicates the transmission pattern comprises:
transmitting, for each of the plurality of transmit beams, an indication of a corresponding reference signal of the plurality of reference signals.

13. The method of claim 8, wherein one or more dimensions of a channel matrix associated with the channel state information are based at least in part on a total number of receive antenna ports of the UE, a total number of transmit antenna ports of the base station, or both.

14. The method of claim 8, wherein transmitting the signaling that indicates the transmission pattern comprises:
transmitting downlink control information, a medium access control-control element, radio resource control signaling, or any combination thereof that indicates the transmission pattern.

15. An apparatus for wireless communication, comprising:
a processor of a user equipment (UE);
a transceiver coupled with the processor; and
memory coupled with the processor, the memory and the processor configured to cause the apparatus to:
receive, via the transceiver and from a base station, signaling that indicates a transmission pattern for a plurality of transmit beams associated with two or more synchronization signal blocks, wherein the transmission pattern corresponds to sets of two or more concurrently transmitted beams within the plurality of transmit beams;
monitor for a plurality of reference signals associated with the plurality of transmit beams based at least in part on the transmission pattern, wherein:
each of the sets of two or more concurrently transmitted beams is associated with a respective set of two or more reference signals within the plurality of reference signals, each reference signal of the respective set of two or more reference signals associated with a respective orthogonal cover code; and
a first reference signal associated with a first synchronization signal block is monitored for concurrently with a second reference signal associated with a second synchronization signal block, the first reference signal and the second reference signal associated with one of the sets of two or more concurrently transmitted beams, and the two or more synchronization signal blocks comprising the first synchronization signal block and the second synchronization signal block; and transmit, via the transceiver, channel state information to the base station based at least in part on monitoring for the plurality of reference signals.

16. The apparatus of claim 15, wherein, to monitor for the plurality of reference signals, the memory and the processor are configured to cause the apparatus to:
monitor, during a first symbol period, for a first set of two or more reference signals within the plurality of reference signals and associated with a first set of two or more concurrently transmitted beams within the plurality of transmit beams; and
monitor, during a second symbol period, for a second set of two or more reference signals within the plurality of reference signals and associated with a second set of two or more concurrently transmitted beams within the plurality of transmit beams.

17. The apparatus of claim 15, wherein, to receive the signaling that indicates the transmission pattern, the memory and the processor are configured to cause the apparatus to:
receive, via the transceiver and for each of the plurality of reference signals, an indication of the respective orthogonal cover code for the reference signal.

18. The apparatus of claim 15, wherein a set of two or more reference signals within the plurality of reference signals and associated with a set of two or more concurrently transmitted beams within the plurality of transmit beams comprises at least two reference signals associated with a same synchronization signal block within the two or more synchronization signal blocks.

19. The apparatus of claim 15, wherein, to receive the signaling that indicates the transmission pattern, the memory and the processor are configured to cause the apparatus to:
receive, via the transceiver and for each of the plurality of transmit beams, an indication of a corresponding reference signal of the plurality of reference signals.

20. The apparatus of claim 15, wherein one or more dimensions of a channel matrix associated with the channel state information are based at least in part on a total number of receive antenna ports of the UE, a total number of transmit antenna ports of the base station, or both.

21. An apparatus for wireless communication, comprising:
a processor of a base station;
a transceiver coupled with the processor; and
memory coupled with the processor, the memory and the processor configured to cause the apparatus to:
transmit, via the transceiver and to a user equipment (UE), signaling that indicates a transmission pattern for a plurality of transmit beams associated with two or more synchronization signal blocks, wherein the transmission pattern corresponds to sets of two or more concurrently transmitted beams within the plurality of transmit beams;
transmit, via the transceiver, a plurality of reference signals associated with the plurality of transmit beams based at least in part on the transmission pattern, wherein:
each of the sets of two or more concurrently transmitted beams is associated with a respective set of two or more reference signals within the plurality of reference signals, each reference signal of the respective set of two or more reference signals associated with a respective orthogonal cover code; and a first reference signal associated with a first synchronization signal block is transmitted concurrently with a second reference signal associated with a second synchronization signal block, the first reference signal and the second reference signal associated with one of the sets of two or more concurrently transmitted beams, and the two or more synchronization signal blocks comprising the first synchronization signal block and the second synchronization signal block; and receive, via the transceiver, channel state information from the UE based at least in part on transmitting the plurality of reference signals.

22. The apparatus of claim 21, wherein, to transmit the plurality of reference signals, the memory and the processor are configured to cause the apparatus to:

transmit, via the transceiver and during a first symbol period, a first set of two or more reference signals within the plurality of reference signals and associated with a first set of two or more concurrently transmitted beams within the plurality of transmit beams; and transmit, via the transceiver and during a second symbol period, a second set of two or more reference signals within the plurality of reference signals and associated with a second set of two or more concurrently transmitted beams within the plurality of transmit beams.

23. The apparatus of claim 21, wherein, to transmit the signaling that indicates the transmission pattern, the memory and the processor are configured to cause the apparatus to:

transmit, via the transceiver and for each of the plurality of reference signals, an indication of the respective orthogonal cover code for the reference signal.

24. The apparatus of claim 21, wherein a set of two or more reference signals within the plurality of reference signals and associated with a set of two or more concurrently transmitted beams within the plurality of transmit beams comprises at least two reference signals associated with a same synchronization signal block within the two or more synchronization signal blocks.

25. The apparatus of claim 21, wherein, to transmit the signaling that indicates the transmission pattern, the memory and the processor are configured to cause the apparatus to:

transmit, via the transceiver and for each of the plurality of transmit beams, an indication of a corresponding reference signal of the plurality of reference signals.

26. The apparatus of claim 21, wherein a dimension of a channel associated with the channel state information is based at least in part on a total number of receive antenna ports of the UE and a total number of transmit antenna ports of the base station.

* * * * *